(12) United States Patent
Li et al.

(10) Patent No.: US 11,652,300 B2
(45) Date of Patent: May 16, 2023

(54) RADIATING ELEMENTS HAVING ANGLED FEED STALKS AND BASE STATION ANTENNAS INCLUDING SAME

(71) Applicant: CommScope Technologies LLC, Hickory, NC (US)

(72) Inventors: Haifeng Li, Richardson, TX (US); Peter J. Bisiules, LaGrange Park, IL (US); XiaoHua Hou, Richardson, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/205,122

(22) Filed: Mar. 18, 2021

(65) Prior Publication Data

US 2021/0305718 A1    Sep. 30, 2021

Related U.S. Application Data

(60) Provisional application No. 63/087,451, filed on Oct. 5, 2020, provisional application No. 62/993,925, filed on Mar. 24, 2020.

(51) Int. Cl.
*H01Q 21/06* (2006.01)
*H01Q 21/26* (2006.01)
*H01Q 9/06* (2006.01)

(52) U.S. Cl.
CPC ............ *H01Q 21/062* (2013.01); *H01Q 9/06* (2013.01); *H01Q 21/26* (2013.01)

(58) Field of Classification Search
CPC ........ H01Q 21/062; H01Q 9/06; H01Q 21/26; H01Q 1/521; H01Q 1/246; H01Q 5/48
See application file for complete search history.

(56) References Cited

U.S. PATENT DOCUMENTS

| | | | |
|---|---|---|---|
| 7,907,096 B2 | 3/2011 | Timofeev et al. | |
| 2004/0169612 A1 | 9/2004 | Song et al. | |
| 2004/0259597 A1 | 12/2004 | Gothard et al. | |
| 2005/0264463 A1 | 12/2005 | Gottl et al. | |

(Continued)

FOREIGN PATENT DOCUMENTS

| | | | | |
|---|---|---|---|---|
| CN | 100492763 C | * | 5/2009 | ............. H01Q 1/246 |
| CN | 201528038 U | | 7/2010 | |

(Continued)

OTHER PUBLICATIONS

Shepard et al. "Argos: Practical Many-Antenna Base Stations" Proceedings of the 18th Annual International Conference on Mobile Computing and Networking (12 pages) (Aug. 26, 2012).

(Continued)

*Primary Examiner* — Hoang V Nguyen
(74) *Attorney, Agent, or Firm* — Myers Bigel, P.A.

(57) ABSTRACT

Radiating elements of first and second linear arrays of radiating elements have respective feed stalks that can reside at an angle to provide a balanced dipole arm with an inner end portion laterally offset to be closer to a right or left side of the base station antenna and reflector than an outer end portion that faces a radome of the base station antenna. The feed stalk can include sheet metal legs and printed circuit boards providing an RF transmission line(s).

27 Claims, 31 Drawing Sheets

(56) References Cited

U.S. PATENT DOCUMENTS

| | | | |
|---|---|---|---|
| 2006/0273865 A1* | 12/2006 | Timofeev | H01Q 3/36 |
| | | | 333/161 |
| 2007/0229385 A1 | 10/2007 | Deng et al. | |
| 2009/0135076 A1* | 5/2009 | Foo | H01Q 1/246 |
| | | | 343/839 |
| 2009/0224994 A1 | 9/2009 | Le et al. | |
| 2012/0087284 A1 | 4/2012 | Linehan et al. | |
| 2012/0280874 A1 | 11/2012 | Kim et al. | |
| 2013/0234883 A1 | 9/2013 | Ma et al. | |
| 2014/0313095 A1* | 10/2014 | Pu | H01Q 1/246 |
| | | | 343/836 |
| 2015/0084823 A1 | 3/2015 | Wang et al. | |
| 2015/0097739 A1 | 4/2015 | Samuel | |
| 2016/0365618 A1 | 12/2016 | Kim et al. | |
| 2017/0040679 A1 | 2/2017 | Fröhler et al. | |
| 2018/0269577 A1 | 9/2018 | Kosaka et al. | |
| 2018/0323513 A1 | 11/2018 | Varnoosfaderani et al. | |
| 2019/0123426 A1 | 4/2019 | Bryce | |
| 2019/0173162 A1 | 6/2019 | Farzaneh et al. | |
| 2019/0181557 A1* | 6/2019 | Isik | H01Q 21/26 |
| 2019/0267701 A1 | 8/2019 | Kim et al. | |
| 2019/0312338 A1 | 10/2019 | Guntupalli et al. | |
| 2019/0312394 A1 | 10/2019 | Paynter et al. | |
| 2020/0076079 A1* | 3/2020 | Shan | H01Q 15/14 |
| 2020/0288495 A1 | 9/2020 | Gao et al. | |
| 2021/0305717 A1 | 9/2021 | Hou et al. | |

FOREIGN PATENT DOCUMENTS

| | | | | |
|---|---|---|---|---|
| CN | 101950846 | A | 1/2011 | |
| CN | 201893434 | U | 7/2011 | |
| CN | 102800956 | A | 11/2012 | |
| CN | 103490175 | A | 1/2014 | |
| CN | 103715521 | A | 4/2014 | |
| CN | 104319486 | A | 1/2015 | |
| CN | 206225553 | U | 6/2017 | |
| CN | 109219905 | A | 1/2019 | |
| CN | 110323564 | A | 10/2019 | |
| CN | 114094347 | A | 2/2022 | |
| EP | 1204161 | A1 | 5/2002 | |
| EP | 2784876 | A1 | 10/2014 | |
| EP | 2827449 | A2 | 1/2015 | |
| EP | 3544204 | A2 | 9/2019 | |
| EP | 3751665 | A1 | 12/2020 | |
| WO | 9700586 | A1 | 1/1997 | |
| WO | WO-2009061966 | A1 * | 5/2009 | H01Q 21/08 |
| WO | 2019100325 | A1 | 5/2019 | |
| WO | 2019154362 | A1 | 8/2019 | |
| WO | 2019236203 | A2 | 12/2019 | |
| WO | 2020010039 | A1 | 1/2020 | |
| WO | 2020072880 | A1 | 4/2020 | |

OTHER PUBLICATIONS

International Search Report and the Written Opinion of the International Searching Authority corresponding to International Patent Application No. PCT/US2021/022890 (15 pages) (dated Jul. 7, 2021).

He, Yejun, et al., "Novel Dual-Band, Dual-Polarized, Miniaturized and Low-Profile Base Station Antenna", IEEE Transactions on Antennas and Propagation, vol. 63, No. 12, Dec. 2015, 5399-5408.

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

Extended European Search Report corresponding to European Patent Application No. 21777118.7 (22 pages) (dated Apr. 19, 2022).

* cited by examiner

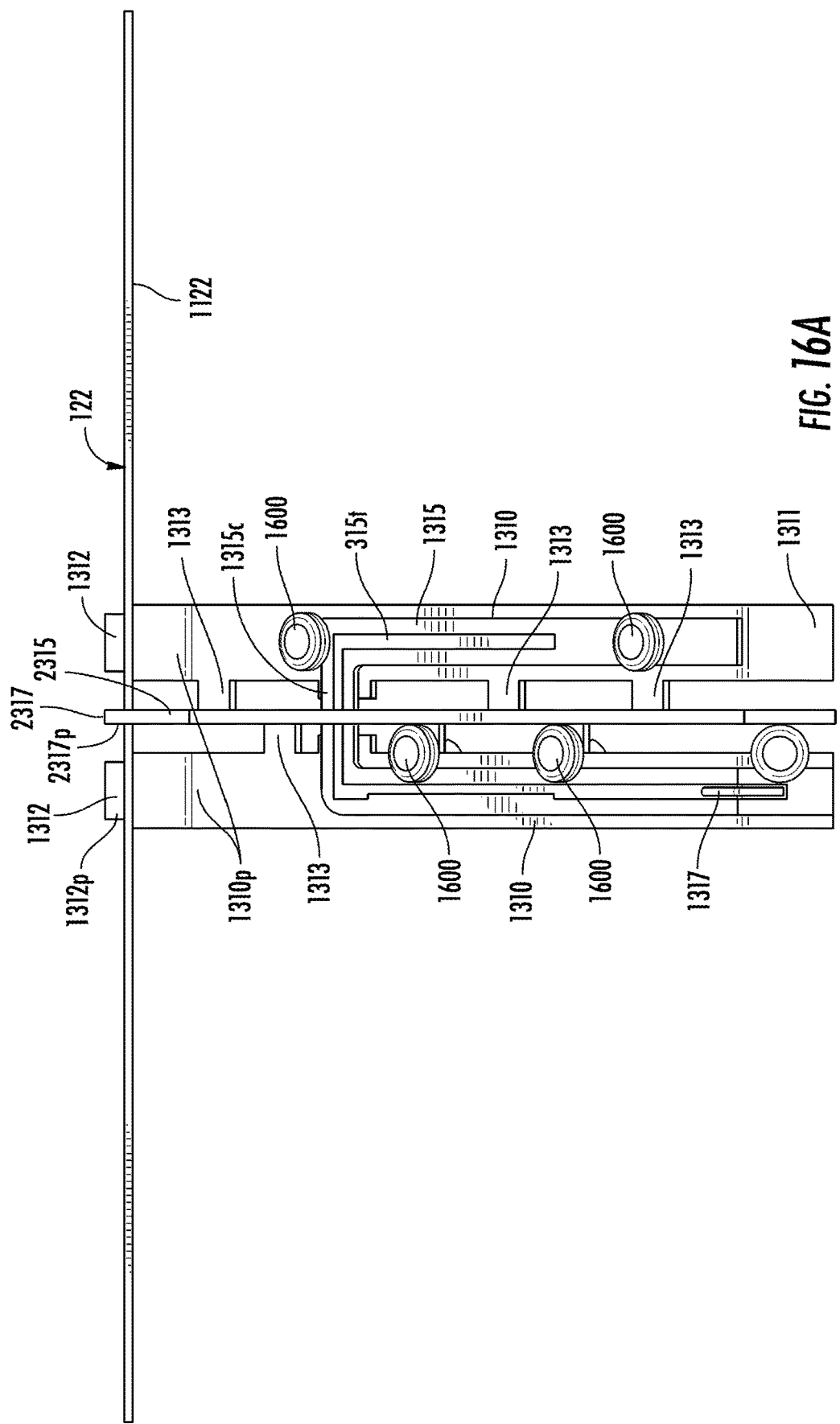

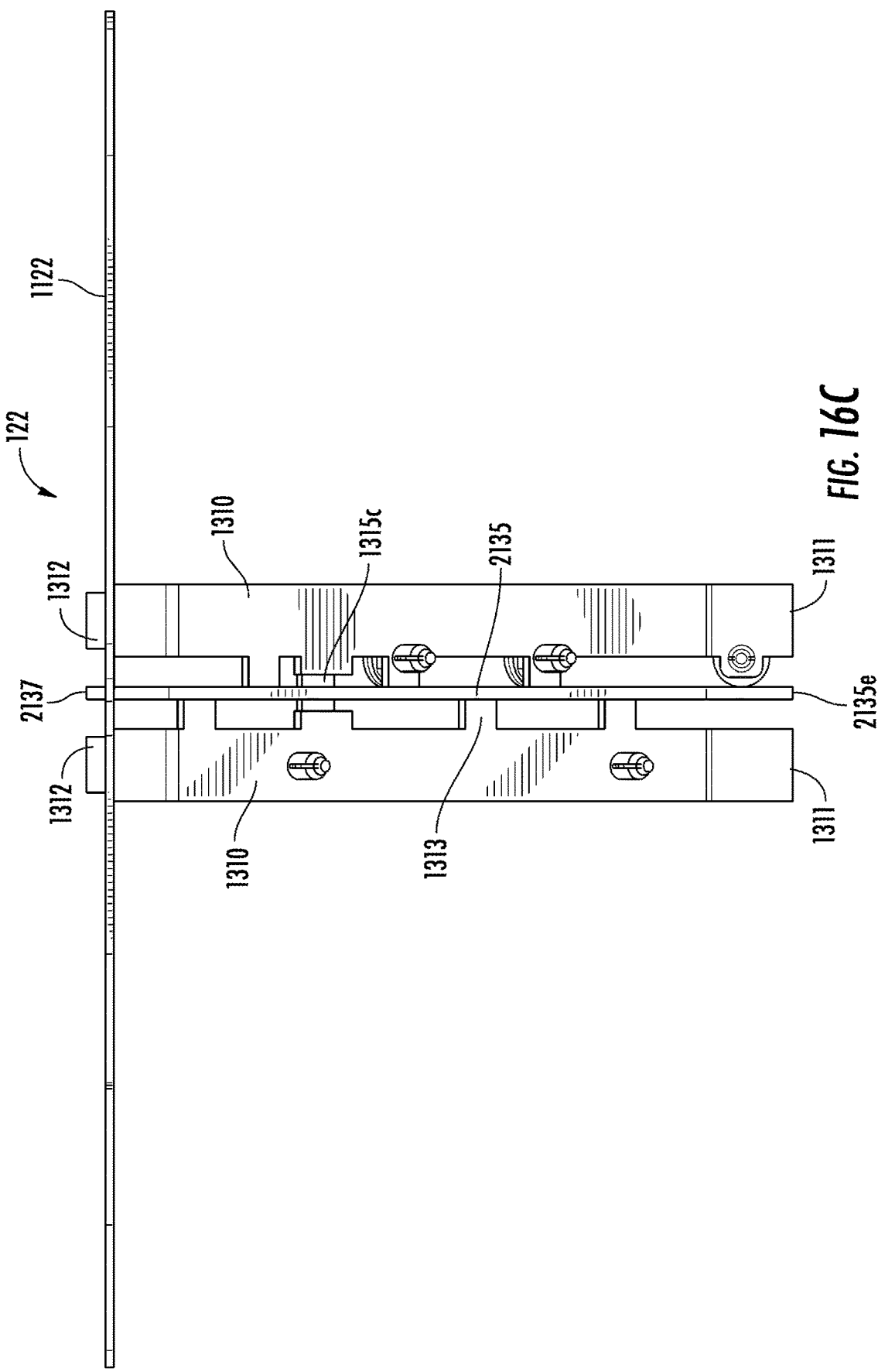

RADIATING ELEMENTS HAVING ANGLED FEED STALKS AND BASE STATION ANTENNAS INCLUDING SAME

RELATED APPLICATIONS

This application claims the benefit of and priority to U.S. Provisional Patent Application Ser. No. 62/993,925 filed Mar. 24, 2020 and U.S. Provisional Patent Application Ser. No. 63/087,451 filed Oct. 5, 2020, the contents of which are hereby incorporated by reference as if recited in full herein.

BACKGROUND

The present invention generally relates to radio communications and, more particularly, to base station antennas for cellular communications systems.

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular to the horizontal plane that is defined by the horizon. Reference will also be made to the azimuth plane, which is a horizontal plane that bisects the base station antenna, and to the elevation plane, which is a plane extending along the boresight pointing direction of the antenna that is perpendicular to the azimuth plane.

A common base station configuration is the "three sector" configuration in which a cell is divided into three 120° sectors in the azimuth plane. A base station antenna is provided for each sector. In a three sector configuration, the antenna beams generated by each base station antenna typically have a Half Power Beamwidth ("HPBW") in the azimuth plane of about 65° so that each antenna beam provides good coverage throughout a 120° sector. Three such base station antennas provide full 360° coverage in the azimuth plane. Typically, each base station antenna will include one or more so-called "linear arrays" of radiating elements that includes a plurality of radiating elements that are arranged in a generally vertically-extending column. Each radiating element may have an azimuth HPBW of approximately 65° so that the antenna beam generated by the linear array will have a HPBW of about 65° in the azimuth plane. By providing a phase-controlled column of radiating elements extending along the elevation plane, the HPBW of the antenna beam in the elevation plane may be narrowed to be significantly less than 65°, with the amount of narrowing increasing with the length of the column in the vertical direction.

As the volume of cellular traffic has grown, cellular operators have added new cellular services in a variety of new frequency bands. When these new services are introduced, the existing "legacy" services typically must be maintained to support legacy mobile devices. In some cases, it may be possible to use linear arrays of so-called "wideband" radiating elements to support service in the new frequency bands. In other cases, however, it may be necessary to deploy additional linear arrays (or multi-column arrays) of radiating elements to support service in the new frequency bands. Due to local zoning ordinances and/or weight and wind loading constraints, there is often a limit as to the number of base station antennas that can be deployed at a given base station. Thus, to reduce the number of antennas, many operators deploy so-called "multiband" base station antennas that include multiple linear arrays of radiating elements that communicate in different frequency bands to support multiple different cellular services. Additionally, with the introduction of fifth generation (5G) cellular services, multi-column arrays of radiating elements are being added to base station antennas that can support beamforming and/or massive multi-input-multi-output ("MIMO") 5G services.

One multiband base station antenna that is currently of interest includes two linear arrays of "low-band" radiating elements that are used to provide service in some or all of the 617-960 MHz frequency band, as well as a massive MIMO array of "high-band" radiating elements that operate in, for example, some or all of the 2.5-2.7 GHz frequency band, the 3.4-3.8 GHz frequency band, or the 5.1-5.8 GHz frequency band. Massive MIMO arrays typically have at least four columns of radiating elements, and as many as thirty-two columns of radiating elements. Most proposed implementations include eight columns of radiating elements (or vertically stacked sets of eight column arrays to obtain sixteen or thirty-two column arrays). One example of such a base station antenna 10 is shown schematically in FIG. 1.

Referring to FIG. 1, the base station antenna 10 includes first and second linear arrays 20-1, 20-2 of low-band radiating elements 22 and a multi-column array 40 of high-band radiating elements 42, here shown with eight columns. The multi-column array 40 of high-band radiating elements 42 may be a massive MIMO high-band array. The radiating elements 22, 42 may be mounted to extend forwardly from a reflector 12 which may serve as a ground plane for the radiating elements 22, 42. As shown in FIG. 1, the low-band linear arrays 20 typically extend for the full length of the base station antenna 10. Note that herein like elements may be assigned two-part reference numerals. These elements may be referred to individually by their full reference numeral (e.g., low-band linear array 20-2) and collectively by the first part of their reference numeral (e.g., the low-band linear arrays 20).

Referring to FIG. 2, the base station antenna 10 further includes a front 10f with a radome 11 and a rear 10r and a reflector 12. The radiating elements 22, 42 face the radome 11 at the front 10f of the base station antenna 10. The radiating elements 22 of the first linear array 20-1 are arranged in a first column and the radiating elements 22 of the second linear array 20-2 are arranged in a second, laterally spaced apart column. The columns of radiating elements 42 of the massive MIMO array 40 can be vertically offset from each other to increase the distance between the radiating elements 42 in adjacent columns.

Cellular operators often have strict limits on allowable widths for different types of base station antenna. For example, the base station antenna 10 can have a maximal width of about 500 mm, in some embodiments to meet commercially acceptable configurations. The base station antenna 10 can be challenging to implement in a commercially acceptable manner because achieving a 65° azimuth HPBW antenna beam in the low-band typically requires low-band radiating elements that are, for example, about 200 mm (or more) wide.

SUMMARY

Embodiments of the invention provide base station antennas with angled feed stalks coupled to radiating elements.

Embodiments of the invention are directed to a radiating element for a base station antenna that has a plurality of dipole arms and a feed stalk coupled to the dipole arms. The feed stalk has longitudinally spaced apart opposing first and second end portions. The second end portion is adjacent the dipole arms and the first end portion is behind the second end portion. The second end portion resides at a first lateral position and is configured to reside closer to a front of the base station antenna than the first end portion. The first end portion is laterally offset from the first lateral position and is configured to reside closer to a right or left side of the base station antenna.

The feed stalk can have at least one angled segment that resides between the first and second end portions and the at least one angled segment can extends at an angle $\beta$ measured between the at least one angled segment and a reflector that is in a range of about 30-60 degrees.

The at least one angled segment can be a single angled segment that extends at a constant angle between the first and second end portions at the angle $\beta$.

The plurality of dipole arms can be provided by a printed circuit board that is coupled to the second end portion of the feed stalk, optionally at a medial location thereof. The first and second end portions of the feed stalk can have at least an end segment that is perpendicular to the printed circuit board.

The feed stalk can include first and second segments as the at least one segment that reside between the first and second end portions and that are at different angles from each other.

The feed stalk can include an RF transmission line that is coupled to a conductive feed member at the first end portion of the feed stalk.

The feed stalk can have at least one leg of sheet metal and can have a first printed circuit board coupled to the at least one leg of sheet metal.

The feed stalk can have a first printed circuit board that is coupled to a pair of spaced apart cooperating sheet metal legs.

The feed stalk can further include a second printed circuit board that is orthogonal to the first printed circuit board.

The first and second printed circuit boards can each include a respective hook balun.

The at least one leg of sheet metal can be arranged as a plurality of cooperating legs of sheet metal. The first and second legs of the plurality of cooperating legs of sheet metal can include an RF transmission line coupled thereto.

The feed stalk can have at least two elongate legs of sheet metal that can extend at least a major length of the feed stalk between the first and second end portions. Optionally, the at least two legs can extend an entire length thereof to also define at least part of the first and second end portions.

The feed stalk can have first and second cooperating sheet metal legs and a printed circuit board comprising an RF transmission line that can be held conformally to a sub-length of the first and second sheet metal legs. The printed circuit board can have a cross-segment that spans across a gap space between the first and second legs that can be at a location closer to and below the second end portion of the feed stalk than the first end portion of the feed stalk.

The at least two elongate legs of sheet metal can be provided as four elongate legs of sheet metal arranged in first and second pairs of elongate legs of sheet metal. The first pair of legs of sheet metal can be coupled to a first printed circuit board and the second pair of elongate legs of sheet metal can be coupled to a second printed circuit board. The first printed circuit board can be orthogonal to the second printed circuit board.

The printed circuit board can be a first printed circuit board. The feed stalk can further include a second printed circuit board having a rigid or semi-rigid and self-supporting shape that is spaced apart from the at least two sheet metal legs and comprises an RF transmission line. The second printed circuit board can be orthogonal to the first printed circuit board.

The second printed circuit board can be coupled to the first and second sheet metal legs and can include a slot. The cross-segment of the first printed circuit board can extend through the slot of the second printed circuit board.

The radiating element can be provided as a first dipole radiator and a second dipole radiator. The first dipole radiator can include a first dipole arm that extends in a first direction and a second dipole arm that extends in a second direction. The second dipole radiator can include a third dipole arm that extends in a third direction and a fourth dipole arm that extends in a fourth direction. Optionally, the first dipole radiator is configured to transmit RF radiation having slant $-45°$ polarization, and the second dipole radiator is configured to transmit RF radiation having slant $+45°$ polarization.

Other embodiments are directed to a base station antenna that includes: a reflector; a first array comprising a first vertically-extending column of radiating elements and mounted to be forward of the reflector; a second array comprising a second vertically-extending column of radiating elements and mounted to be forward of the reflector; and a multiple column array of radiating elements. A least some of the radiating elements of the first and second arrays each comprise a feed stalk that extends in a front-to-back direction of the base station antenna. The feed stalk has spaced apart opposing first and second end portions. The first end portion is rearward of the second end portion and is configured to couple to a feed network. The second end portion is closer to a front of the base station antenna than the first end portion. The first end portion resides at a lateral position that is laterally offset from a lateral position of the second end portion to reside closer to a right or left side of the base station antenna than the first end portion.

The multiple column array can be positioned laterally between the first array and the second array of radiating elements at an upper portion of the base station antenna.

The radiating elements of the first array and the second array can be low-band radiating elements. The radiating elements of the multiple column array can be higher-band radiating elements than the low-band radiating elements.

The feed stalk can have at least one angled segment that resides between the first and second end portions. The at least one angled segment can extends at an angle $\beta$ measured between the at least one angled segment and a reflector that can be in a range of about 30-60 degrees.

The at least one angled segment can be a single angled segment that extends at a constant angle between the first and second end portions at the angle $\beta$.

The dipole arms of the radiating elements of the first and second arrays can be provided by a respective printed circuit board. The first and second end portions of the feed stalk can have an end segment that is perpendicular to the printed circuit board.

The feed stalk can have first and second segments that reside between the first and second end portions and that can beat different angles to each other.

The feed stalk can have at least one leg of sheet metal coupled to a first printed circuit board.

The feed stalk can have a first printed circuit board that can be coupled to a pair of spaced apart cooperating sheet metal legs.

The feed stalk can also have a second printed circuit board that is orthogonal to the first printed circuit board.

The first and second printed circuit boards can each include a respective hook balun.

The feed stalk can have a plurality of cooperating legs of sheet metal, at least some of which can include an RF transmission trace coupled thereto.

The feed stalk can have first and second cooperating sheet metal legs and a printed circuit board comprising an RF transmission line that may be held conformally to a sublength of the first and second sheet metal legs. The printed circuit board can have a cross-segment that spans across a gap space between the first and second legs that can be at a location closer to and below the second end portion of the feed stalk than the first end portion of the feed stalk.

The feed stalk can include four elongate legs of sheet metal arranged as first and second pairs of elongate legs of sheet metal. The first pair of legs of sheet metal can be coupled to a first printed circuit board and the second pair of elongate legs of sheet metal can be coupled to a second printed circuit board. The first printed circuit board can be orthogonal to the second printed circuit board and reside under a printed circuit board providing a respective radiating element of the first and second arrays.

The feed stalk can further include a second printed circuit board having a rigid or semi-rigid and self-supporting shape that can be spaced apart from the at least two sheet metal legs and that can include an RF transmission line. The second printed circuit board can optionally be orthogonal to the first printed circuit board.

The second printed circuit board can be coupled to the first and second sheet metal legs and can include a slot. The cross-segment of the first printed circuit board can extend through the slot.

The feed stalks of the first and second arrays each can further include a first printed circuit board comprising an RF transmission line that can be held conformally to first and second ones of the at least two elongate legs of sheet metal and a second printed circuit board that can have a rigid or semi-rigid and self supporting shape and that can include an RF transmission line. The second printed circuit board can be orthogonal to the first printed circuit board. Dipole arms of the radiating elements of the first and second arrays can be provided by a respective third printed circuit board that resides in front of the first and second printed circuit boards.

Each radiating element of the first and second arrays can be provided by a printed circuit board defining a first dipole radiator and a second dipole radiator. The first dipole radiator can include a first dipole arm that extends in a first direction and a second dipole arm that extends in a second direction. The second dipole radiator can include a third dipole arm that extends in the third direction and a fourth dipole arm that extends in a fourth direction. Optionally, the first dipole radiator is configured to transmit RF radiation having slant −45° polarization, and the second dipole radiator is configured to transmit RF radiation having slant +45° polarization.

The first end portion of the feed stalk can reside closer to a side wall of the base station antenna than the second end portion The first end portion of the feed stalk can be coupled to and/or can reside adjacent to a side wall of a housing of the base station antenna and can extend laterally inwardly relative to the side wall.

The reflector can include a reflector side wall that is orthogonal to a primary surface of the reflector. The first end portion of the feed stalk can project laterally inwardly from the reflector side wall.

Other embodiments are directed to a base station antenna that includes: a first reflector; a second reflector; and a plurality of radiating elements. A first segment of a respective radiating element resides in front of the first reflector and a second segment of the respective radiating element resides in front of the second reflector.

The first and second reflectors can be capacitively coupled.

The base station antenna can further include a radome between adjacent segments of the first and the second reflector.

BRIEF DESCRIPTION OF THE DRAWINGS

FIG. 11 is a side perspective view of another example embodiment of a radiating element with an angled feed stalk according to embodiments of the present invention.

FIG. 16A is an enlarged side view of the radiating element with angled feed stalk shown in FIG. 15A.

FIG. 16C is an enlarged side view of the radiating element with angled feed stalk opposite to the side shown in FIG. 16A.

DETAILED DESCRIPTION

Figure 3:
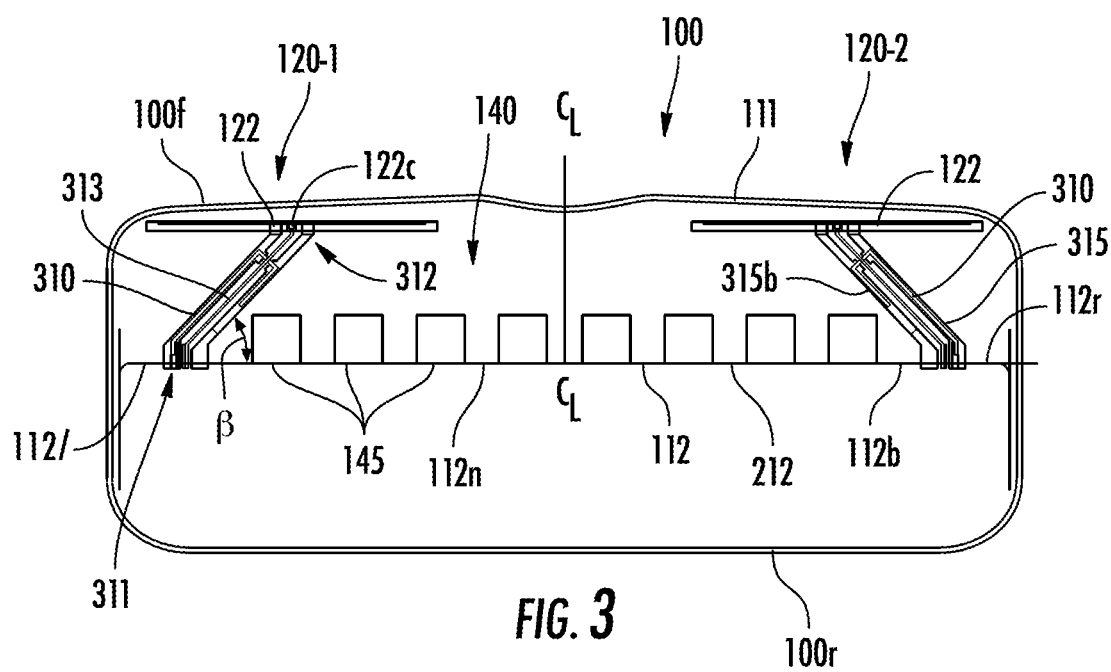
FIG. 3 is a simplified schematic section view of a base station antenna that includes a massive MIMO array and two lower-band linear arrays of radiating elements with angled feed stalks according to embodiments of the present invention.

Referring to FIG. 3, a base station antenna 100 according to embodiments of the present invention can include a first linear array 120-1 of radiating elements 122, a second linear array 120-2 of radiating elements 122, and a massive MIMO array 140 of radiating elements 145. The base station antenna 100 has a front 100$f$ with a radome 111, a rear 100$r$ and a reflector 112. The radiating elements 122, 145 face the radome 111 at the front 100$f$ of the base station antenna 100. The radiating elements 122 of the first linear array 120-1 are arranged in a first column and the radiating elements 122 of the second linear array 120-2 are arranged in a second column that is laterally spaced apart from the first column. The radiating elements 145 of the massive MIMO array 140 can be arranged in vertically-offset columns as is well known to those of skill in the art.

The massive MIMO array 140 can be a massive MIMO high-band array. The first and second linear arrays 120-1, 120-2 can be low-band linear arrays. The base station antenna 10 can have a maximal width that is about 500 mm, in some embodiments (FIG. 5) to meet commercially acceptable configurations. However, other widths may be used. Referring to FIGS. 3 and 18, the massive MIMO array 140 can be positioned adjacent an upper portion segment 100$t$ of the base station antenna 100, laterally between the first and second linear arrays 120-1, 120-2 on reflector 112 and/or adjacent and cooperating reflector 112$a$ and/or 212.

The linear arrays 120-1, 120-2 can include low-band radiating elements 122 according to embodiments of the present invention. The low-band radiating elements 122 may comprise cross-dipole radiating elements that include a total of four dipole arms 122$a$. The low-band radiating elements 122 may be cloaked low-band radiating elements that are configured to be substantially transparent to RF energy in the operating frequency band of the massive MIMO array. For further discussion of example linear arrays and radiating elements with dipole arms, see U.S. Provisional Application Ser. No. 62/994,962, filed Mar. 26, 2020, the content of which is hereby incorporated by reference as if recited in full herein.

Figure 1:
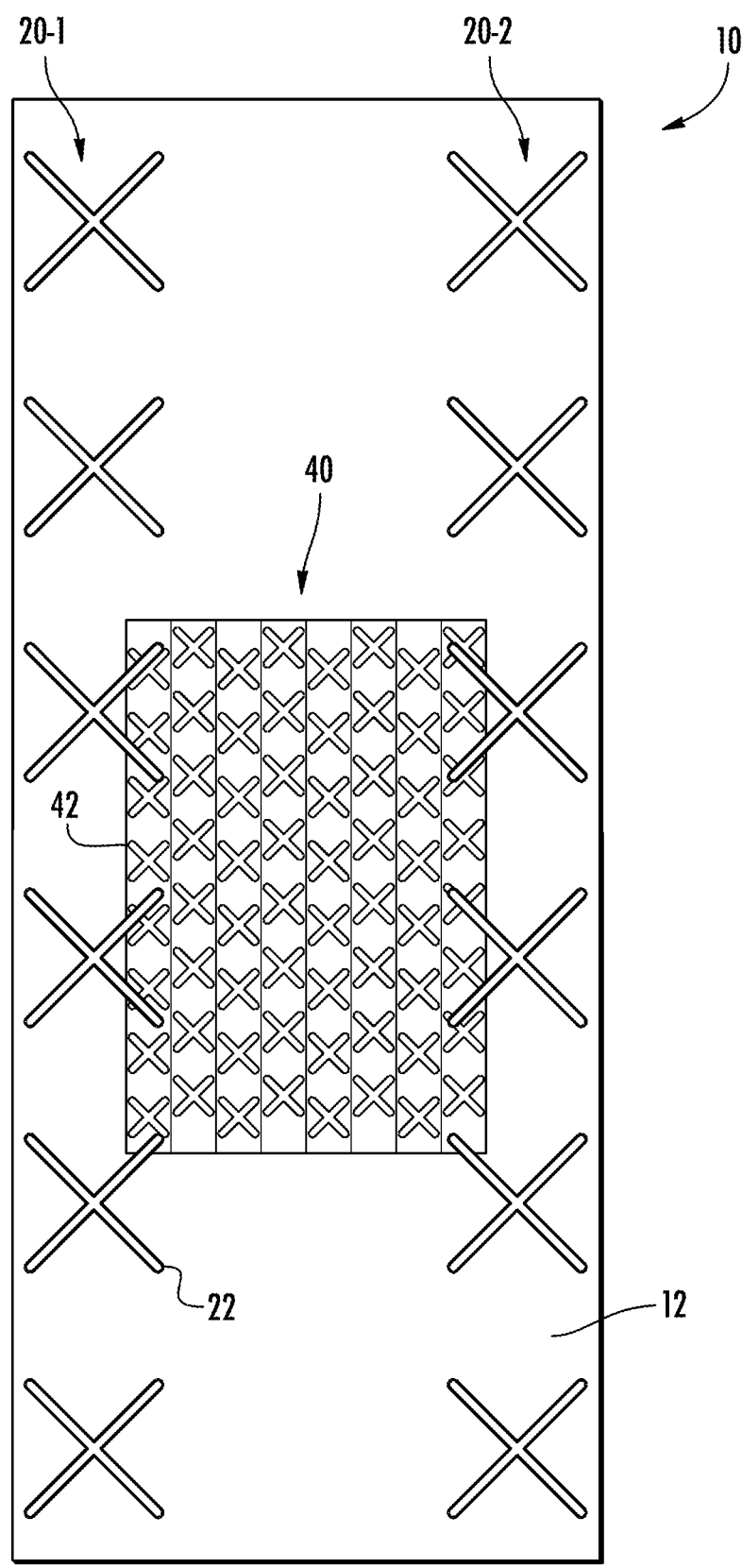
FIG. 1 is a simplified schematic front view of a base station antenna (shown without the radome) that includes two linear arrays of radiating elements and a massive MIMO array of higher band radiating elements.
Figure 2:
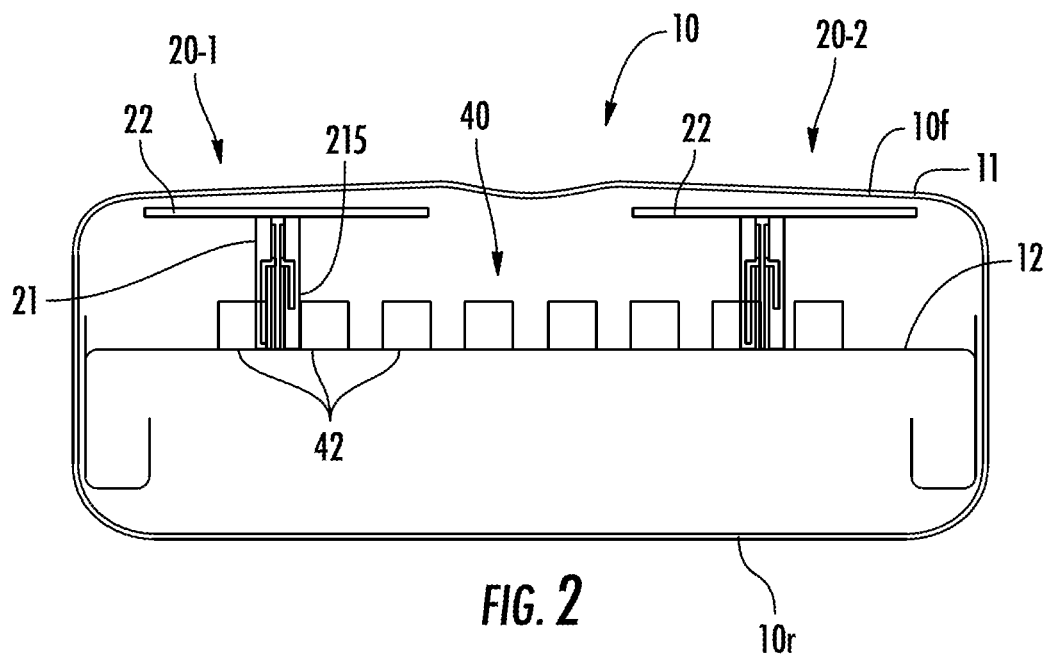
FIG. 2 is a simplified schematic section view of the base station antenna of FIG. 1.

The base station antenna 100 may include the same general types of arrays of radiating elements as the conventional base station antenna 10 of FIGS. 1 and 2. As shown in FIG. 2, the conventional base station antenna 10 includes radiating elements 22 that have a feed stalk 21 that is vertical (in the orientation shown in FIG. 2, outwardly projecting from the reflector 12 in a use orientation). Stated differently, the feed stalk 21 is perpendicular to the reflector 12 and the radome 11 of the base station antenna 10. As shown, due to spacing limitations, the feed stalk 21 is positioned laterally inward to one or more columns of the radiating elements 42 of the massive MIMO array 40 to avoid interference between the dipole arm 22$a$ of the radiating elements 22 and the side surfaces of the radome 11. While an unbalanced dipole arm 22A may be used to position the feed stalk 21 further away from the laterally extending center line of the base station antenna 10 (FIG. 8B), this may undesirably degrade the front-to-back ratio (FBR) performance of the base station antenna and/or isolation between adjacent columns of radiating elements. For example, for a bandwidth range of 690-960 MHz, there is an FBR curve for full band. The X-axis is frequency, Y-axis is FBR value.

Also, it may be difficult to provide sufficient space between the high-band radiating elements 45 for mounting the feed stalks 21 of the low-band radiating elements 22 and for providing connections between the feed stalks 21 and the feed network for the low-band radiating elements 22. To overcome such space limitations, it may be necessary to "thin" the massive MIMO array by removing selected radiating elements 42 thereof to make room for the feed stalks 21 of the low-band radiating elements 22.

As shown in FIG. 3, pursuant to embodiments of the present invention, low-band radiating elements 122 are provided that include "tilted" or "angled" feed stalks 310 that can have at least one segment that extends at an oblique angle from the reflector 112. A first end 311 of the feed stalk 310 of each low-band radiating element 122 can be positioned laterally spaced apart from the outermost radiating element 145 of the massive MIMO array 140 and can reside at a right side 112r or a left side 112l of the reflector 112. Each feed stalk 310 can be configured to extend outward and position the opposing second end portion 312 thereof at a position that is laterally inward from the first end portion 311. A feed circuit 315 on the feed stalk 310 comprises RF transmission lines that are used to pass RF signals between the dipole arms 122a of the cross-dipole radiating elements 122 and a feed network of a base station antenna 100. The feed stalk 310 may also be used to mount the dipole arms 122a at an appropriate distance in front of the reflector 112 of base station antenna 100, which is often approximately 3/16 to 1/4 of an operating wavelength. The "operating wavelength" refers to the wavelength corresponding to the center frequency of the operating frequency band of the radiating element 122. The low-band radiating elements 122 may (but need not be) mounted on a plurality of feed board 112b printed circuit boards. Each feed board 112b may comprise a feed network 112n and be mounted to extend parallel to the reflector 112 and may have one or more radiating elements 122 mounted thereon.

As shown in FIG. 3, the dipole radiator arms 122a extend in a plane that is substantially parallel to the plane defined by an underlying reflector 112. The radiating elements 122 of the first and second arrays 120-1, 120-2 may be designed, for example, to operate in some or all the 617-960 MHz frequency band. The feed circuit 315 typically comprises a hook balun 315b provided on the feed stalk 310.

The feed stalk 310 can have at least one angled segment 313 that starts at a location above the reflector 112 (in the orientation of FIG. 3) and that is laterally inward of the inner (lower) end portion 311 of the feed stalk 310. In some embodiments, the feed stalk can have at least one angled segment that can be angled at an angle β relative to the reflector 112, with β being in a range of about 30 to about 120 degrees.

The RF transmission line on the feed stalk 310 is used to pass RF signals between the feed board 112b (or some other RF transmission line of the feed network) and the dipole arms 122a. In order to reduce the return loss, the position, configuration and/or an area of the feed stalk 310 with the hook balun 315b can be configured to provide a desired impedance match in order to impedance match the RF transmission line on the feed stalk 310 to the impedances of the RF transmission line of the feed network and the dipole arms 122a.

The feed stalk 310 can have a total length that is greater than a straight line distance taken between a center 122c of the dipole arms 122a and the reflector 112.

In the embodiment shown in FIG. 3, the angle β of the at least one angled segment 313 of the feed stalk 310 is in a range of about 30-60 degrees, and the feed stalk 310 extends at this angle β for greater than half an overall length of the feed stalk 310. This angle β can be constant over the entire length of the feed stalk 310 before merging into the first and second end portions 311, 312. The first and second end portions 311, 312 can both be perpendicular to the reflector 112. The second end portion 312 can couple to the dipole arms 122a of the radiating elements 122 at a medial location (s) to be balanced or centered with respect to the radiating element 122 with the dipole arms 122a. The second end portion 312 can define a balanced arm (the dipole radiators defining the arms 122a have a cumulative laterally extending width and the second end portion 312 resides has a symmetric configuration and is centered with respect to the center 122c of the radiating element/printed circuit board 1122 forming same). Stated differently, the term "balanced" arm refers to a symmetrical arm structure with four sides of the same structure. The feed stalk 310 preferably has at least have a symmetrical structure on the horizontal side and vertical side or have a symmetrical structure on the −45 direction and +45 direction.

Figure 4A:
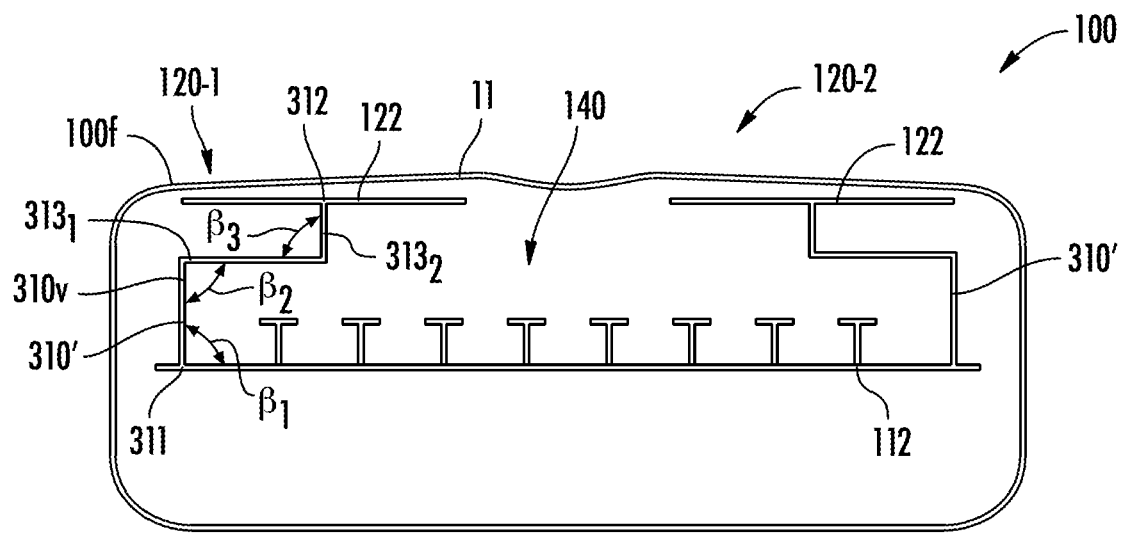
FIGS. 4A, 4B, 4C and 4D are simplified schematic section views of a base station antenna that includes a massive MIMO array and two lower-band linear arrays of radiating elements with other example configurations of angled feed stalks according to embodiments of the present invention.

FIG. 4A schematically illustrates a feed stalk 310' pursuant to further embodiments of the present invention. The feed stalk 310' includes a vertical segment 310v that extends from or below the reflector 112 and is perpendicular ($\beta_1=90$ degrees) to the reflector 112. The vertical segment 310v merges into first and second angled segments $313_1$, $313_2$ both residing above the reflector 112 to position the second end portion 312 of the feed stalk 310' laterally inward relative to the first end portion 311 of the feed stalk 310'. In this embodiment, the first angled segment $313_1$ has an angle $\beta_2$ that is about 90 degrees from the vertical segment 310v to be substantially parallel with the reflector 112. The second angled segment $313_2$ can extend at an angle $\beta_3$ that is about 90 degrees from the first angled segment $313_1$ to be perpendicular to the reflector 112 and substantially parallel to the vertical segment 310v.

"About" with respect to the angles described herein refers to +/−10 degrees thereof and the term "substantially parallel" refers to +/−10 degrees from parallel.

Figure 4B:
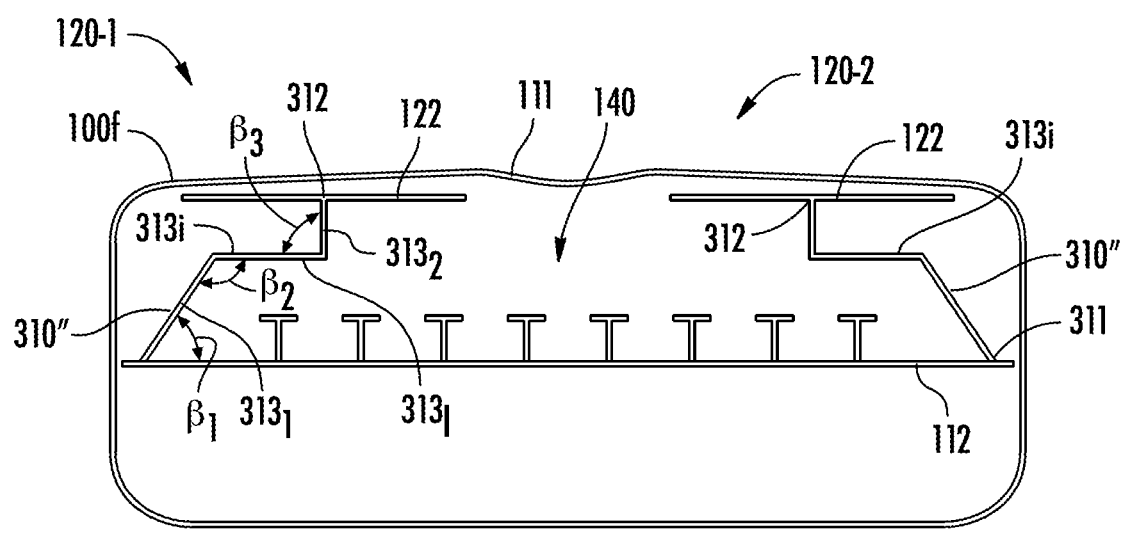

FIG. 4B schematically shows a feed stalk 310'' according to further embodiments of the present invention. As shown, the first angled segment $313_1$ resides at an angle si for a sub-distance of the feed stalk 310'' before merging into an intermediate segment 313i (that is substantially parallel to the reflector 112) before merging into the second angled segment $313_2$. The second angled segment $313_2$ can reside at an angle β from the reflector 112 or the intermediate segment 313i that is between 80-120 degrees. The intermediate segment 313i can reside at an angle θ2 from the first angled segment $313_1$. In some embodiments, $\beta_2$ can be greater than $\beta_1$ and $\beta_3$.

Figure 4C:
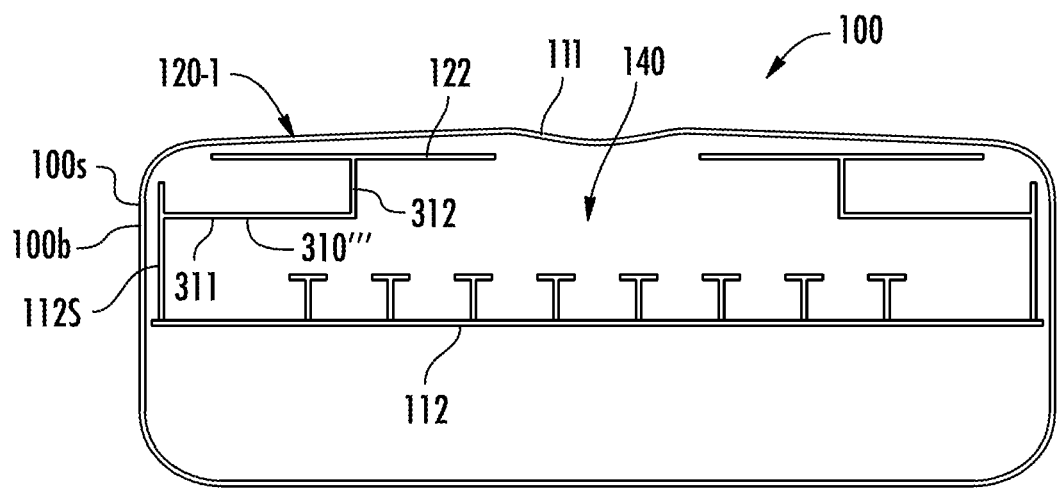

FIG. 4C illustrates that the feed stalk 310''' can be configured to have the first end portion 311 to project inwardly relative to a side wall 100s of the base station antenna 100. The feed stalk 310''' can have a segment that is orthogonal to the reflector 112. The feed stalk 310''' can have an angled inward configuration to position the radiating element 122 at a desired location in front of the reflector 112. The first end portion 311 can project laterally inward from a feed board 112b that can be parallel to the side wall 100s of the base station antenna 100. The first end portion 311 can be coupled to a side wall 112s of the reflector 112 that is perpendicular to a primary surface of the reflector.

Figure 4D:
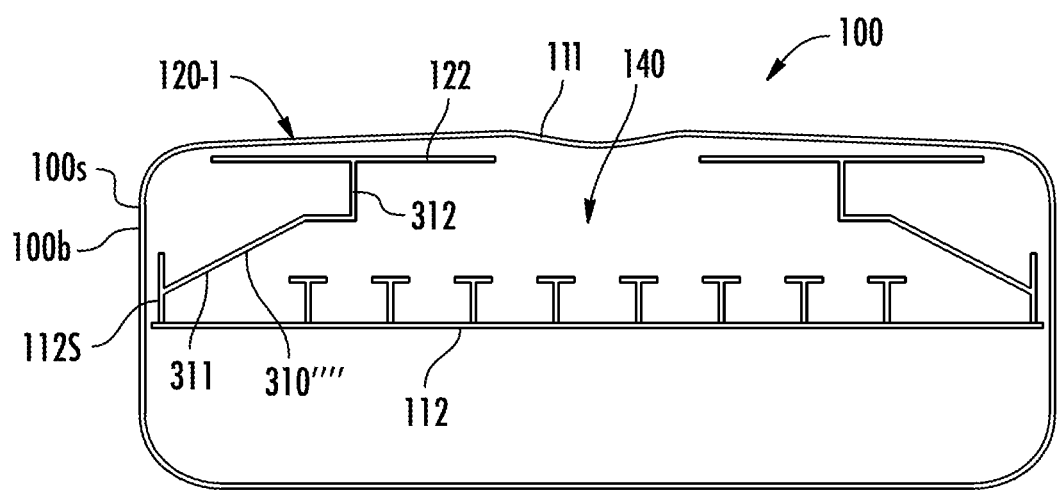

FIG. 4D illustrates that the feed stalk 310"" can be configured to have the first end portion 311 that is similar to FIG. 4C but sits lower on the reflector side wall 112s to allow a shorter reflector side wall 112s and/or outer housing side wall 100s. The feed stalk 310"" projects inwardly relative to a side wall 100s of the base station antenna 100. The feed stalk 310"" can have a segment that is orthogonal to the reflector 112. The first end portion 311 of the feed stalk 310"" can be coupled directly or indirectly to the side wall 100s. The first end portion 311 of the feed stalk 310"" can be coupled to the reflector side wall 112s that is adjacent the housing/outer side wall 100s.

Figure 5:
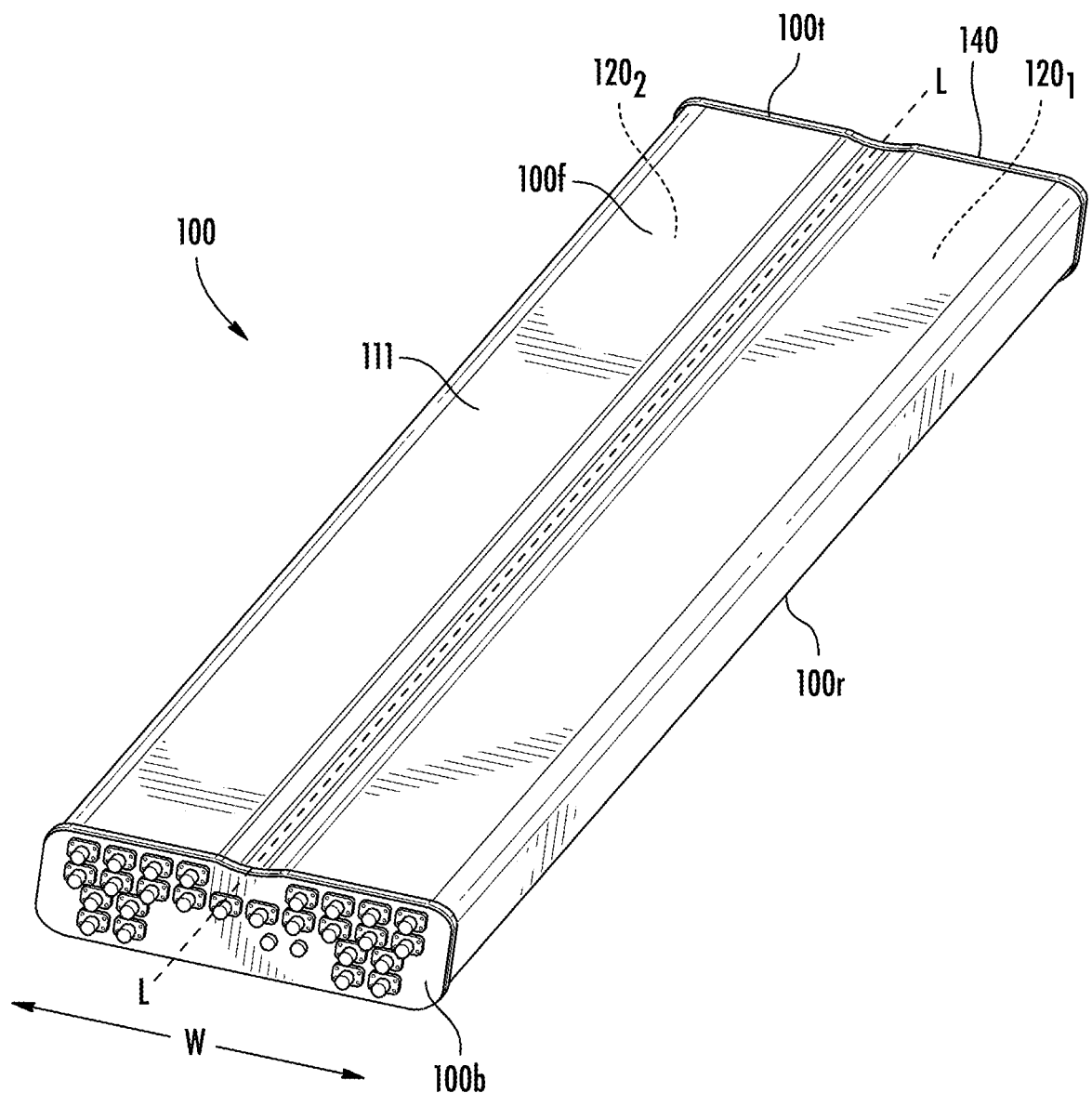
FIG. 5 is a front perspective view of a base station antenna comprising angled feed stalks according to embodiments of the present invention.

FIG. 5 illustrates an example base station antenna 100 that may include a massive MIMO array 140 and first and second arrays 120-1, 120-2 of radiating elements 122 that include feed stalks according to any of the embodiments of the present invention disclosed herein. In some embodiments, the massive MIMO array 140 is positioned closer to the top 100t of the base station antenna 100 than the bottom 100b. The massive MIMO array 140 can comprise high band radiating elements.

Figure 6A:
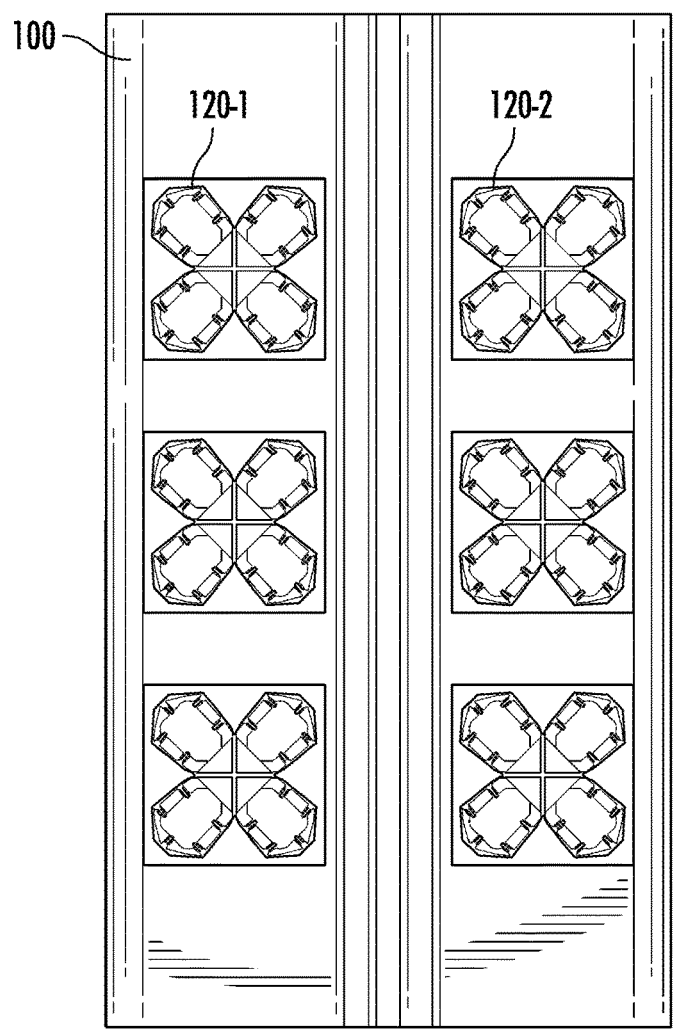
FIG. 6A is a partial, simplified front view of a base station antenna (shown without the radome) that includes lower-band radiating elements that have angled feed stalks according to embodiments of the present invention.
Figure 6B:
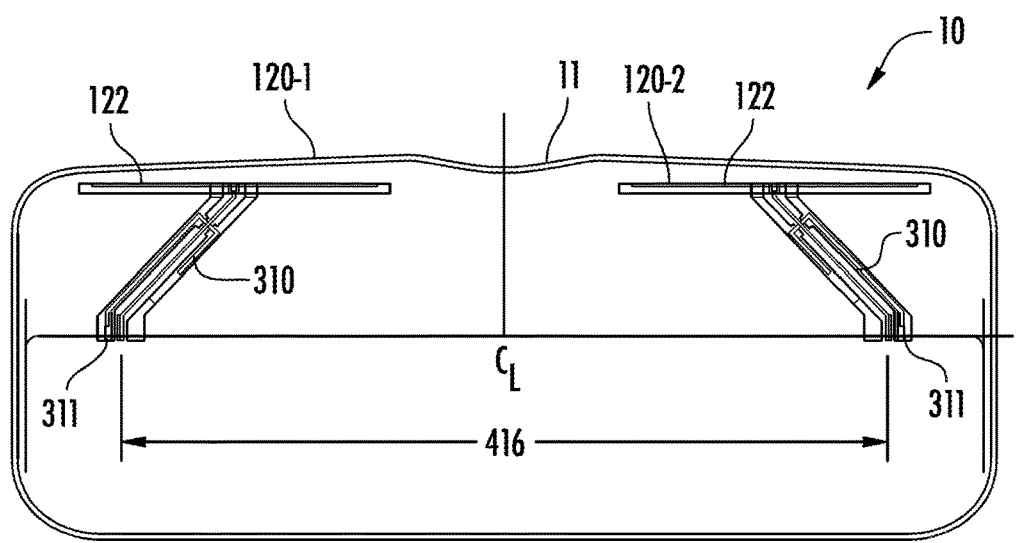
FIG. 6B is a simplified section view of the base station antenna shown in FIG. 6A (shown with the radome).

FIGS. 6A and 6B are simplified partial front view and a simplified section view of the base station antenna 100 with linear arrays 120-1, 120-2 of radiating elements 122 that have the angled feed stalks 310 discussed that are above with reference to FIG. 3.

Figure 6C:
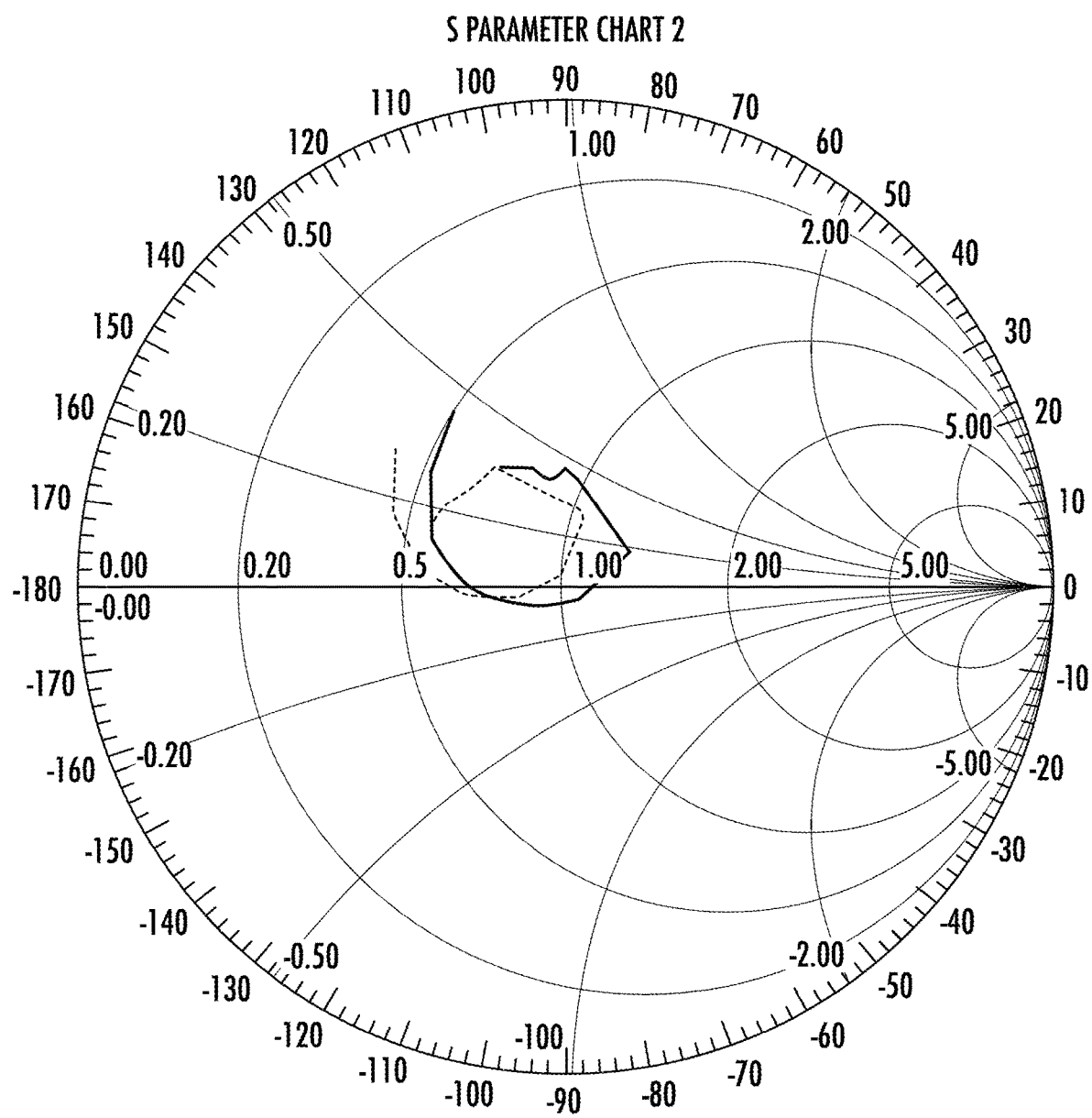
FIG. 6C is an active Smith chart of one of the lower-band linear arrays included in the base station antenna shown in FIGS. 6A and 6B, as generated by a computational model.
Figure 6D:
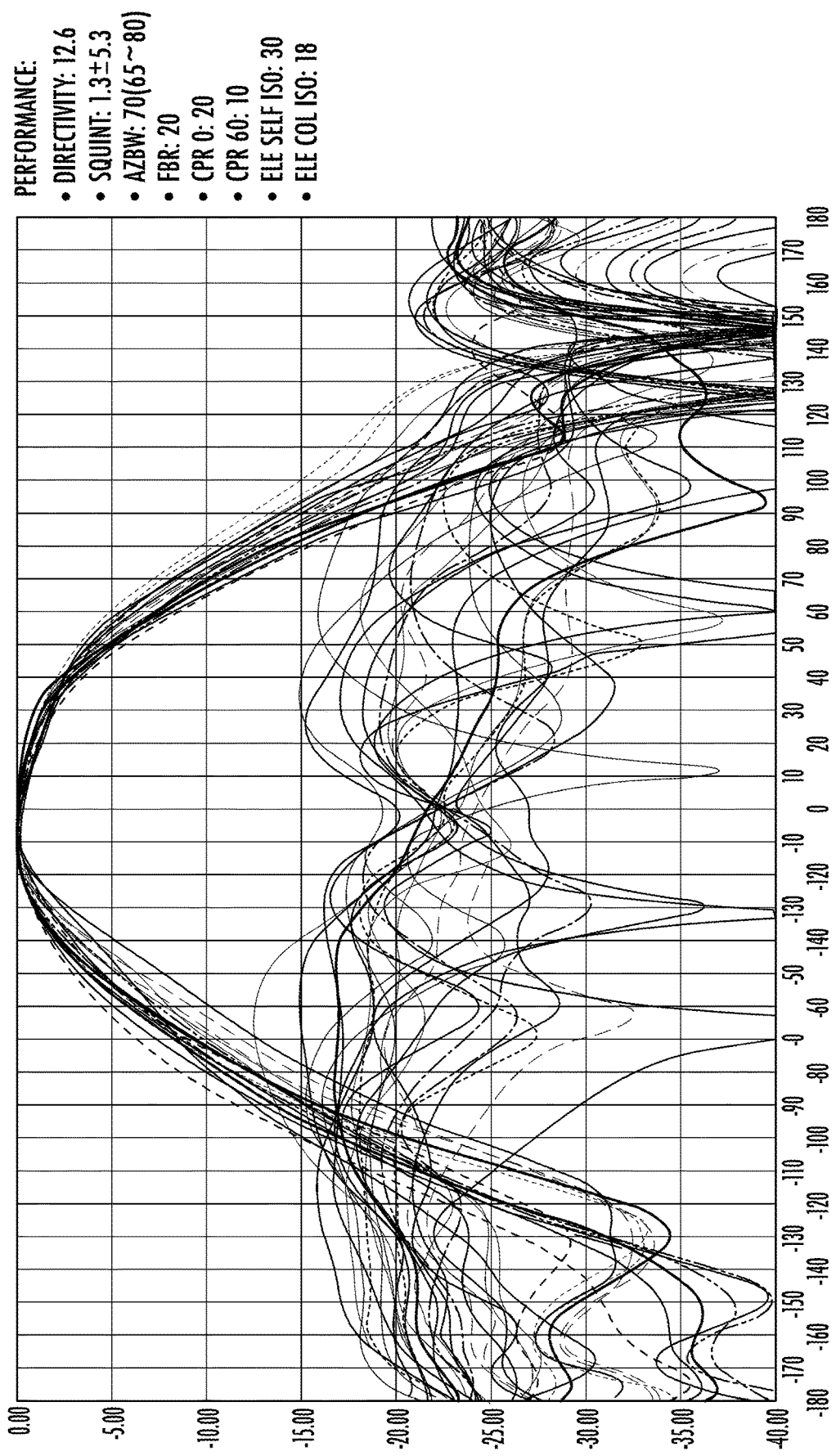
FIG. 6D is a graph of the azimuth pattern for an antenna beam generated by one of the lower-band linear arrays included in the base station antenna of FIGS. 6A and 6B, as generated by a computational model.

FIG. 6B illustrates a spacing of 416 mm between centers of corresponding first end portions 311 of feed stalks 310 in the first and second arrays 120-1, 120-2. FIG. 6C illustrates an active Smith chart of this embodiment as computed by a computational model. FIG. 6D illustrates the azimuth pattern of the antenna beam with an appended summary of resultant performance parameters, as computed by a computational model. In particular, the low-band linear arrays exhibit directivity or gain of 12.6 dB, squint of 1.3°+/−5.3; a 3 dB azimuth beamwidth of 70° at the center frequency of the operating frequency band and about 65° to 80° over the full operating frequency band; a front-to-back ratio of 20 dB; cross polarization ratio for an antenna beam that is not scanned from boresight of 20 dB; cross polarization ratio for an antenna beam that is scanned 60o from boresight of 10 dB; Ele Self ISO: 30; ELE col ISO: 18. The term "Ele Self ISO" refers to the cross polarization isolation between the elements. The term "ELE col ISO" refers to the isolation between the elements in different columns.

Figure 7A:
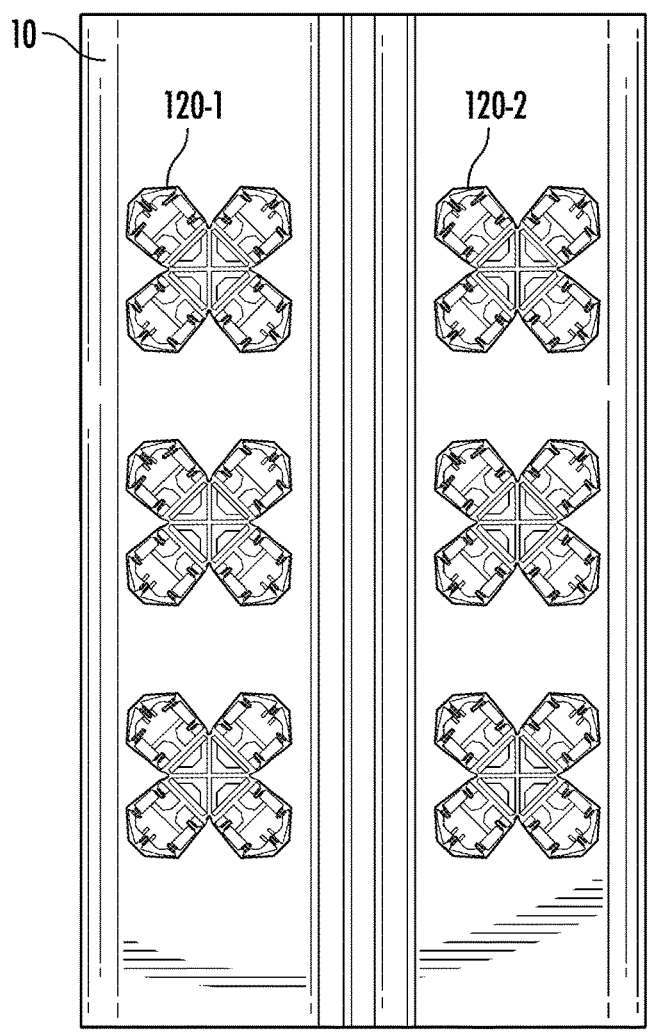
FIG. 7A is a partial, simplified front view of a base station antenna (shown without the radome) that includes lower-band radiating elements having vertical feed stalks.
Figure 7B:
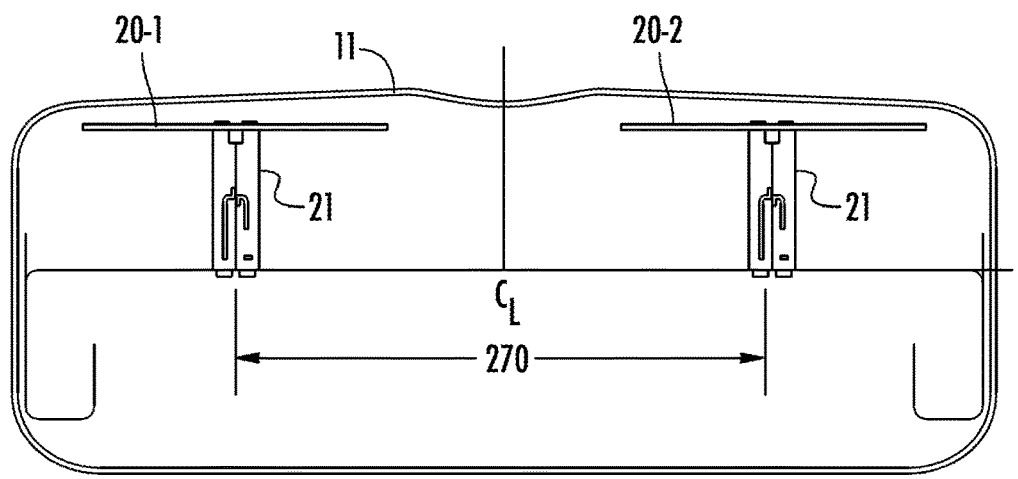
FIG. 7B is a simplified section view of the base station antenna shown in FIG. 7A (shown with the radome).
Figure 7C:
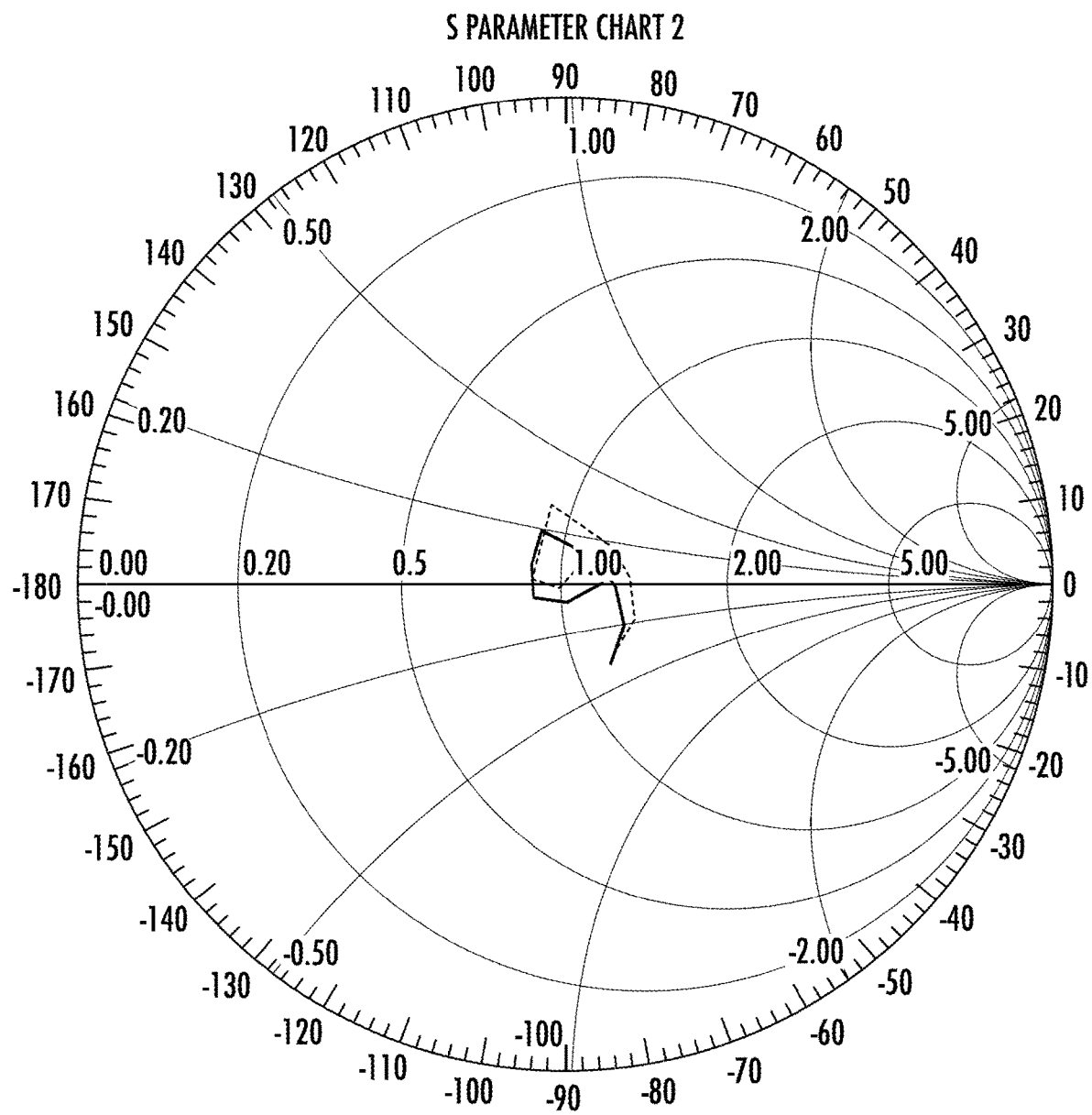
FIG. 7C is an active Smith chart of one of the lower-band linear arrays included in the base station antenna of FIGS. 7A and 7B, as generated by a computational model.
Figure 7D:
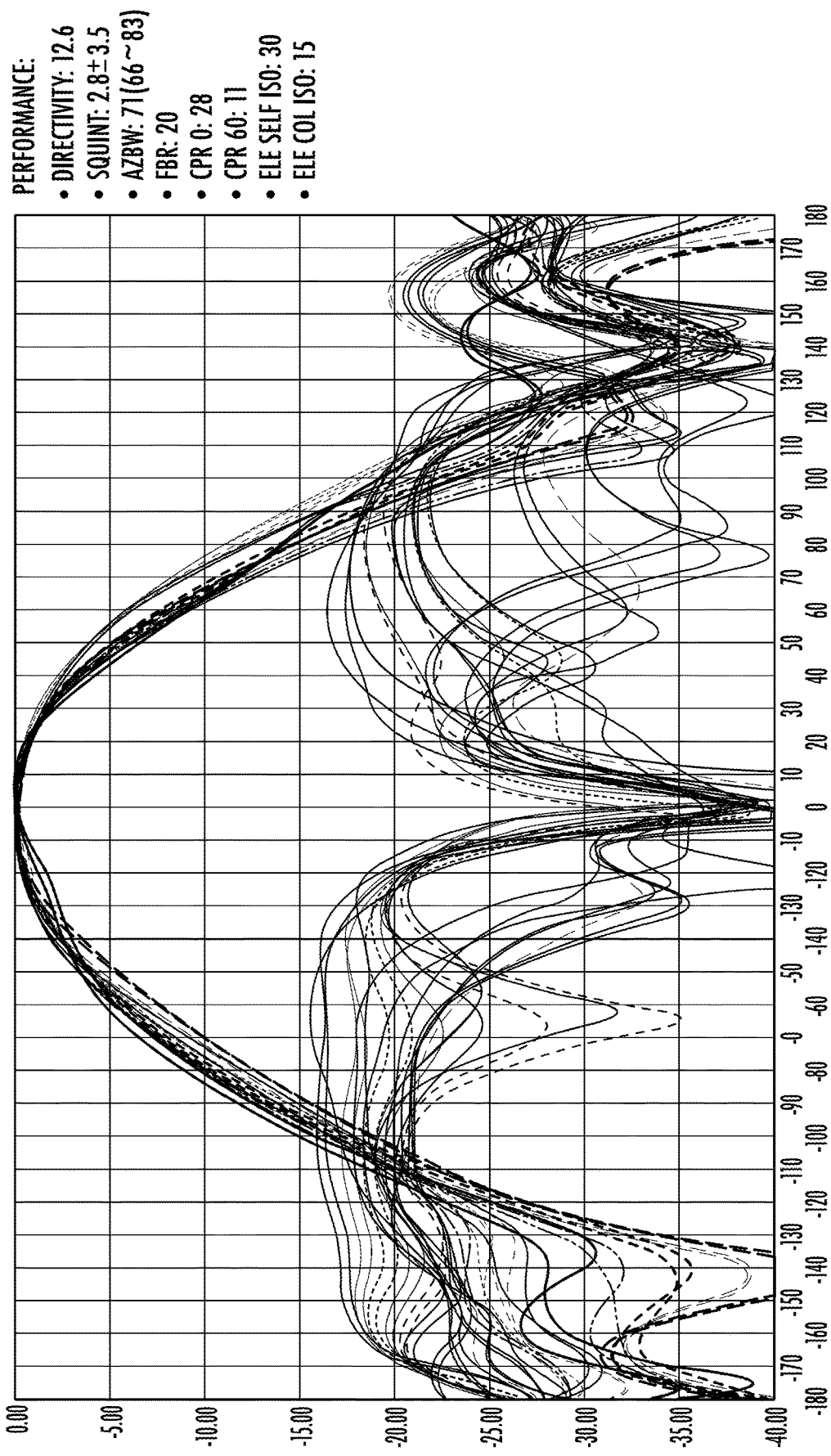
FIG. 7D is a graph of the azimuth pattern for an antenna beam generated by one of the lower-band linear arrays included in the base station antenna of FIGS. 7A and 7B, as generated by a computational model.

FIGS. 7A and 7B are a simplified partial front view and a simplified section view of the conventional base station antenna 10 that includes linear arrays 20-1, 20-2 of radiating elements 22 that have vertical feed stalks 21 such as shown in FIG. 2. FIG. 7B illustrates a spacing of 270 mm between centers of corresponding first end portions of feed stalks 21 in the first and second arrays 120-1, 120-2 (much closer than FIG. 6B). FIG. 7C illustrates an active Smith chart of this embodiment as computed by a computational model. FIG. 7D illustrates the azimuth pattern of the antenna beam with an appended summary of resultant performance parameters, as computed by a computational model. The low-band linear arrays with conventional radiating elements 22 having vertical feed stalks 21 exhibit directivity (gain) of 12.6 dB, squint of 2.8°+/−3.5°; a 3 dB azimuth beamwidth of 71° at the center frequency of the operating frequency band and about 66° to 83° over the full operating frequency band; a front-to-back ratio of 20 dB; cross polarization ratio for an antenna beam that is not scanned from boresight of 28 dB; cross polarization ratio for an antenna beam that is scanned 60° from boresight of 12 dB; Ele Self ISO: 30; ELE col ISO: 15. Thus, the Ele col. ISO is less than the feed stalk shown in FIG. 6B. The feed stalk 310 provides improved isolation between adjacent columns.

Figure 8A:
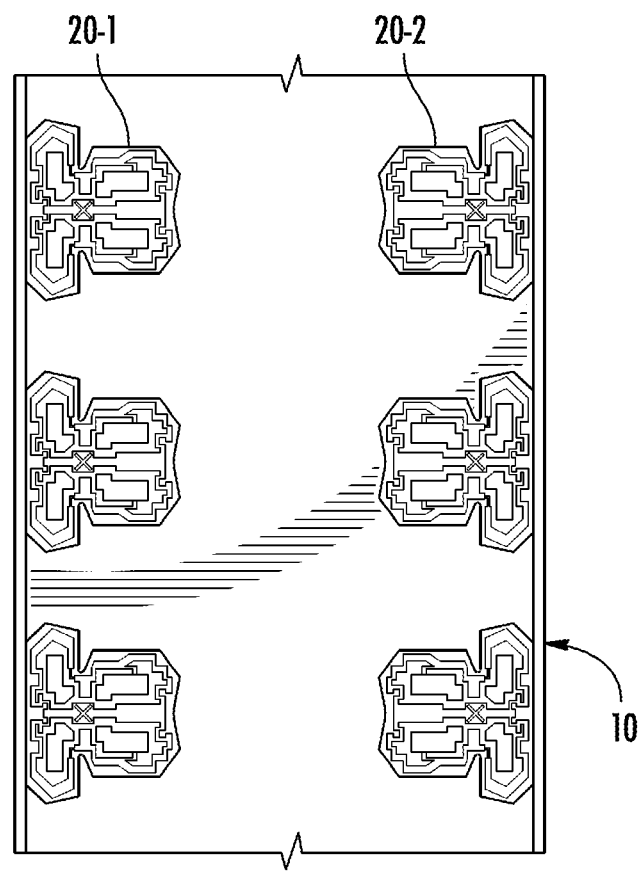
FIG. 8A is a partial, simplified front view of a base station antenna (shown without the radome) that includes lower-band radiating elements having vertical feed stalks and unbalanced dipole arm.
Figure 8B:
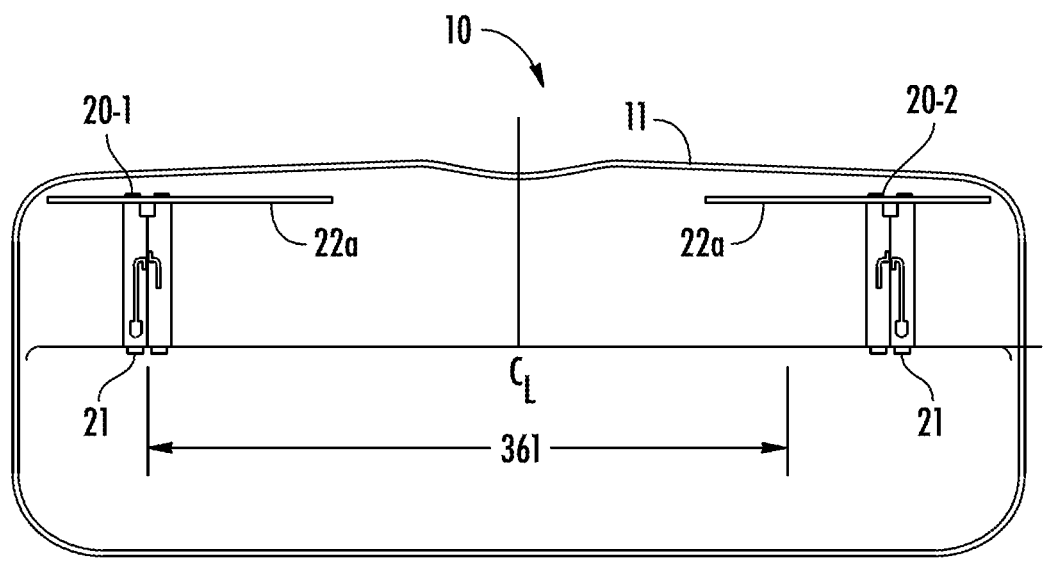
FIG. 8B is a simplified section view of the base station antenna shown in FIG. 8A (shown with the radome).
Figure 8C:
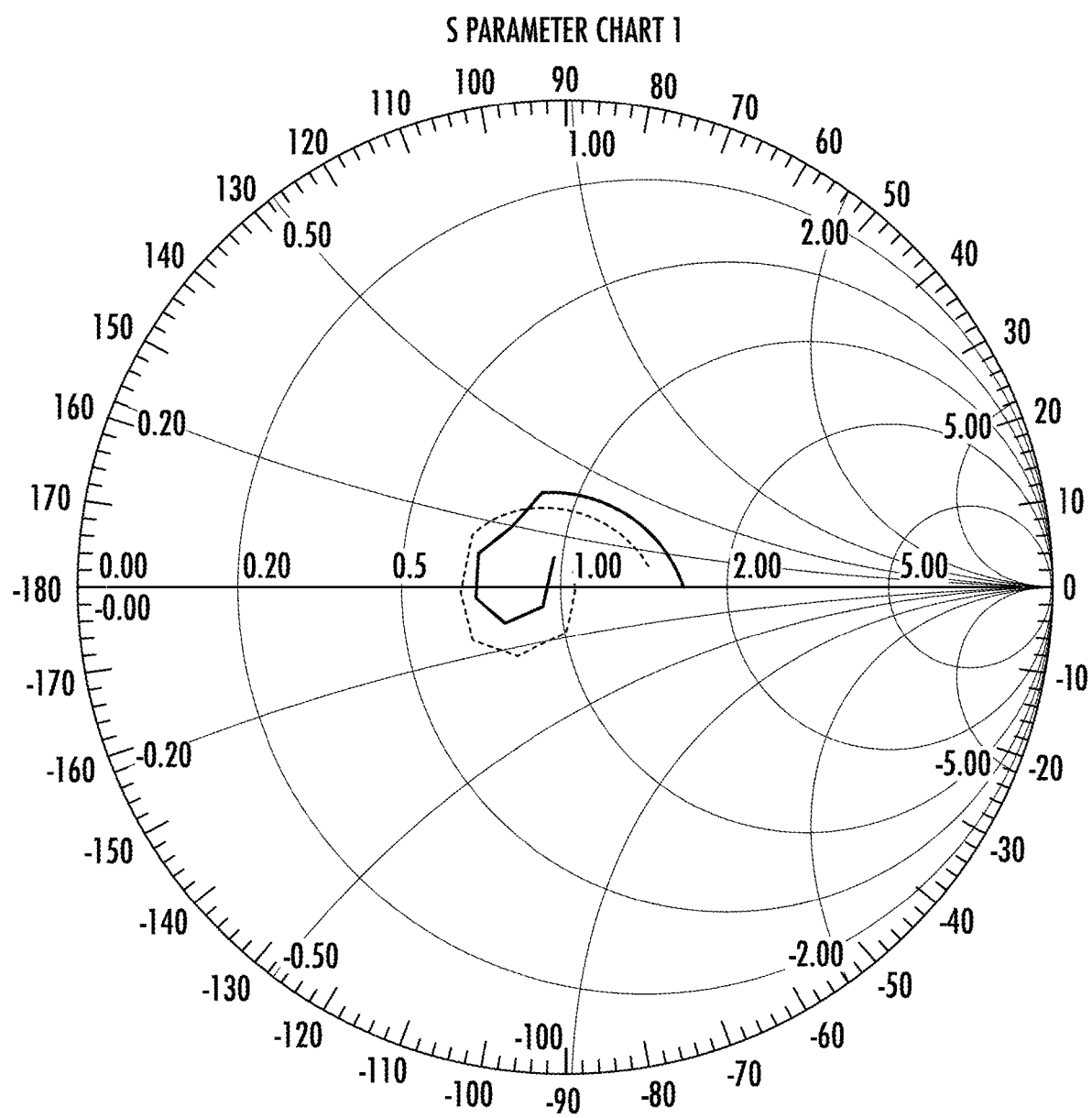
FIG. 8C is an active Smith chart of one of the lower-band linear arrays included in the base station antenna of FIGS. 8A and 8B, as generated by a computational model.
Figure 8D:
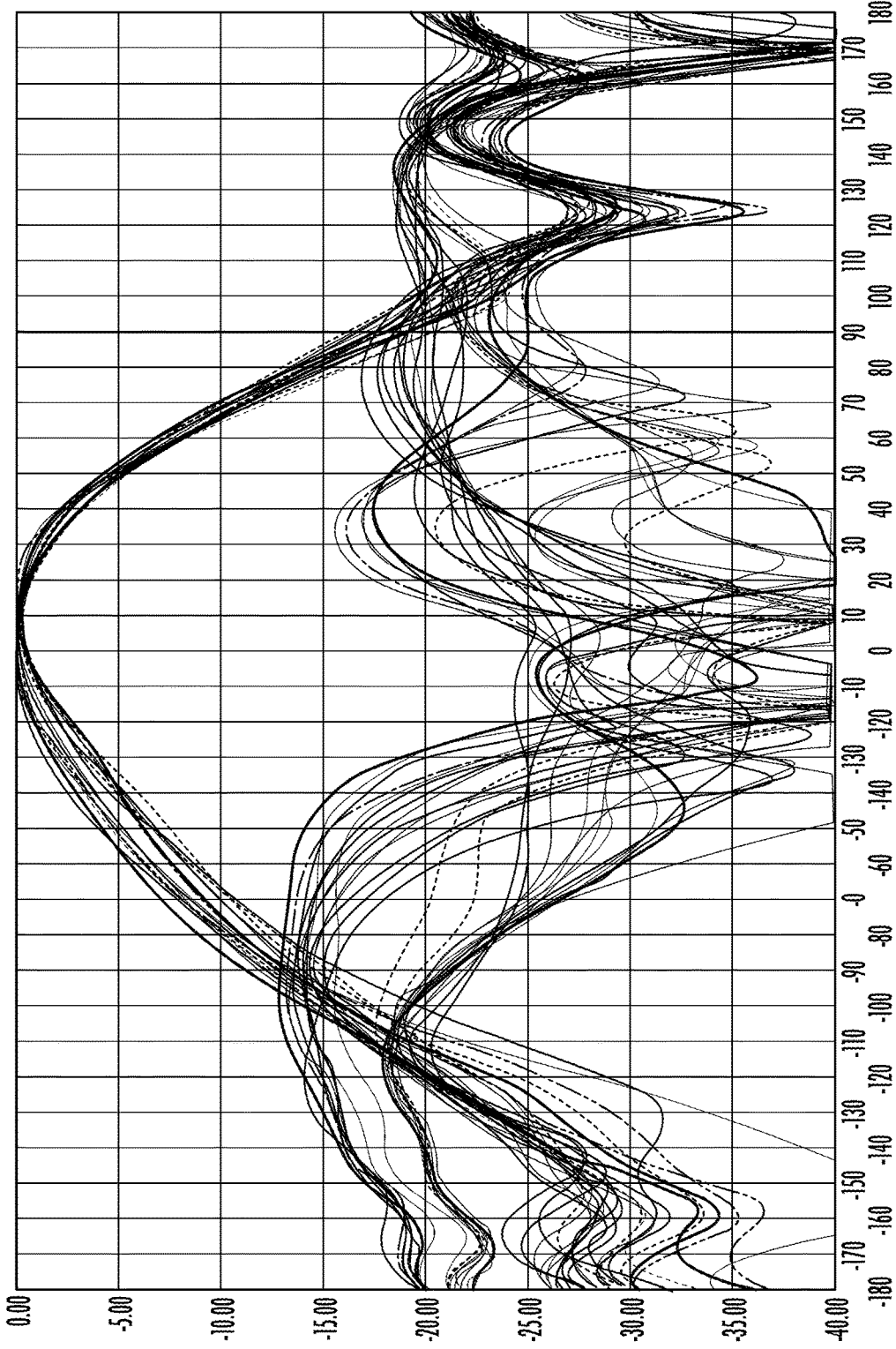
FIG. 8D is a graph of the azimuth pattern for an antenna beam generated by one of the lower-band linear arrays included in the base station antenna of FIGS. 8A and 8B, as generated by a computational model.

FIGS. 8A and 8B are a simplified partial front view and a simplified section view of a base station antenna 10 with linear arrays 120-1, 120-2 of radiating elements 122 that have vertical stalks 210 and unbalanced dipole arms 122a. FIG. 8B illustrates a spacing of 361 mm between centers of first end portions of corresponding feed stalks 210 in the first and second arrays 120-1, 120-2 (closer than FIG. 6B but further than FIG. 7B). FIG. 8C illustrates an active Smith chart of this embodiment as computed by a computational model. FIG. 8D is an azimuth pattern of the antenna beam with an appended summary of resultant performance parameters, as computed by a computational model. The low-band linear arrays with radiating elements 122 having vertical feed stalks 210 and unbalanced dipole arms 122a exhibit directivity (gain) of 12.2 dB, squint of 5.2°+/−6.5°; a 3 dB azimuth beamwidth of 73° at the center frequency of the operating frequency band and about 67° to 83° over the full operating frequency band; a front-to-back ratio of 16.2 dB; cross polarization ratio for an antenna beam that is not scanned from boresight of 27 dB; cross polarization ratio for an antenna beam that is scanned 60o from boresight of 8 dB; Ele Self ISO: 23; ELE col ISO: 18. Thus, the Ele Self ISO is less and the directivity, squint and front-to-back ratio are worse than that of the feed stalk shown in FIG. 6B.

Figure 9A:
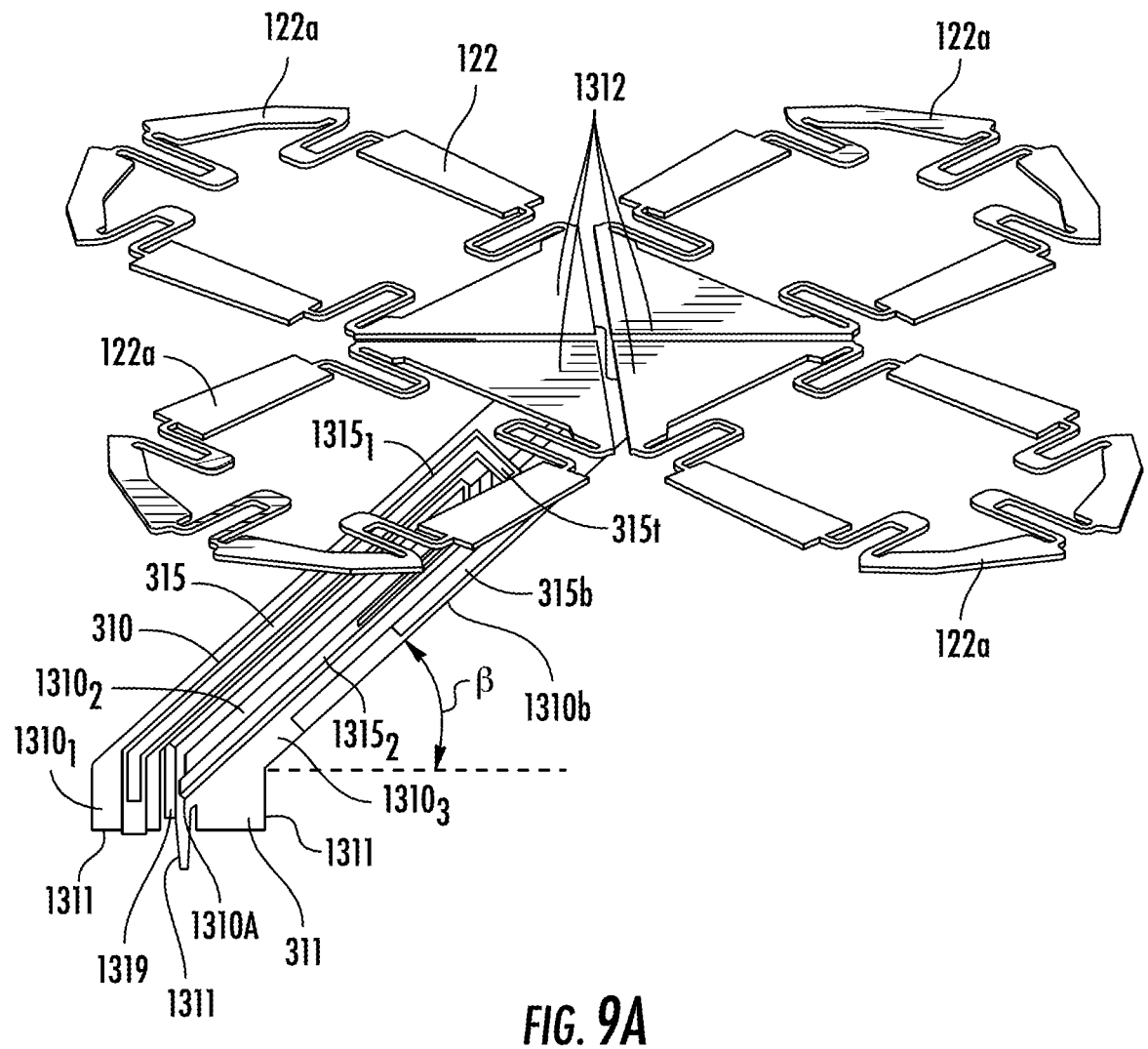
FIG. 9A is an enlarged front, side perspective view of an example radiating element with an angled feed stalk according to embodiments of the present invention.
Figure 9B:
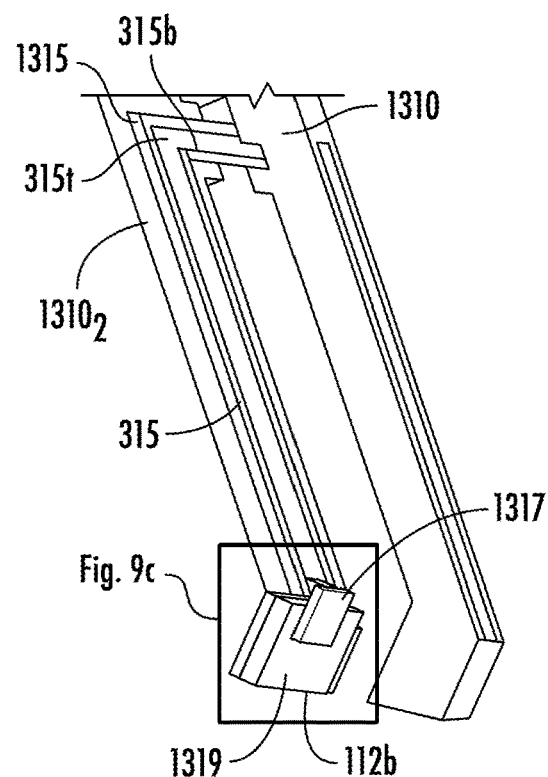
FIG. 9B is a side perspective view of a segment of the feed stalk shown in FIG. 9A.
Figure 9C:
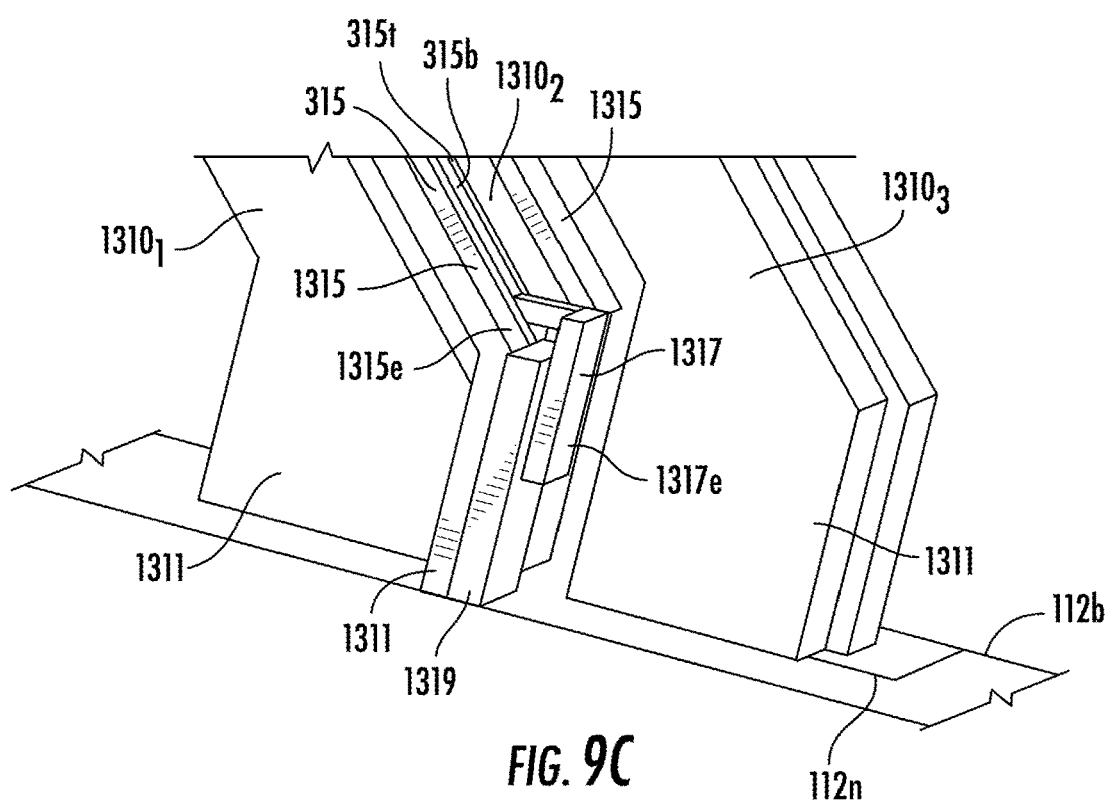
FIG. 9C is a greatly enlarged lower end view of the feed stalk shown in FIG. 9B.

Referring to FIGS. 9A-9C, an example radiating element 122 with an angled feed stalk 310 is shown. In this example embodiment, the angled feed stalk 310 comprises a plurality of cooperating formed sheet metal legs 1310, each having a self-supporting shape. Each sheet metal leg 1310 can have a primary body segment 1310b that extends at an angle β that is in a range of about 30-75 degrees for at least a major portion of its length between opposing first and second end portions, 1311, 1312, respectively. The first end portions 1311 can collectively define the first end portion 311 of the feed stalk 310. The second end portions 1312 can be coupled to a printed circuit board 1122 (FIG. 10) providing the dipole arms 122a of the radiating element 122. The second end portions 1312 of the sheet metal components 1310 can collectively define the second end portion 312 of the feed stalk 310. The first end portions 1311 can all be orthogonal to the reflector 112 and can be coupled to the reflector 112 and/or feed board 112b and may be electrically connected to the feed network for the low-band linear array 120.

The first end portions 1311 of the sheet metal legs 1310 can be secured to reside on, extend down into or below the reflector 112. The first end portions 1311 of the feed stalk 310 can be soldered to the feed board 112b without the use of slots through the feed board 112b in some embodiments.

The sheet metal legs 1310 can provide a cost-effective manufacturing for providing the formed shapes of the feed stalk 310 over using printed circuit boards alone and may provide easier assembly for desired tolerances.

The feed stalk 310 can have a narrower extent when using the PCB microstrip (MS) line for the circuit 315.

As shown, the feed stalk 310 has four cooperating sheet metal legs $1310_1$-$1310_4$. At least some of the sheet metal legs 1310 can provide part of the feed circuit 315 forming the balun(s) 315b.

The feed circuit 315 includes a pair of RF transmission lines or traces 315t that are used to pass RF signals between the feed network and the dipole arms 122a. In the depicted embodiment, the RF transmission lines 315t are formed using printed circuit boards 1315 that are coupled to one or more of the formed sheet metal legs 1310. Each printed circuit board 1315 comprises a dielectric substrate that includes a metal trace 315*t* that is opposite the sheet metal leg on which the printed circuit board 1315 is mounted. Each printed circuit board 1315 can be planar and/or conformal to a primary surface of the sheet metal leg 1310. The traces 315*t* of the feed circuit 315 can be straight, meandering and/or curvilinear. The printed circuit boards 1315 can have any outer perimeter shape such as square, rectangular, triangular or oval. The printed circuit boards 1315 may have a metallized back surface that is maintained at ground potential or can be devoid of a metallized back surface and use the sheet metal legs 1310 as the ground plane for the microstrip transmission line.

The printed circuit boards 1315 can be flexible, rigid or semi-rigid printed circuit boards. The term "semi-rigid" means that the printed circuit board has sufficient rigidity to define a self-supporting shape.

Figure 10:
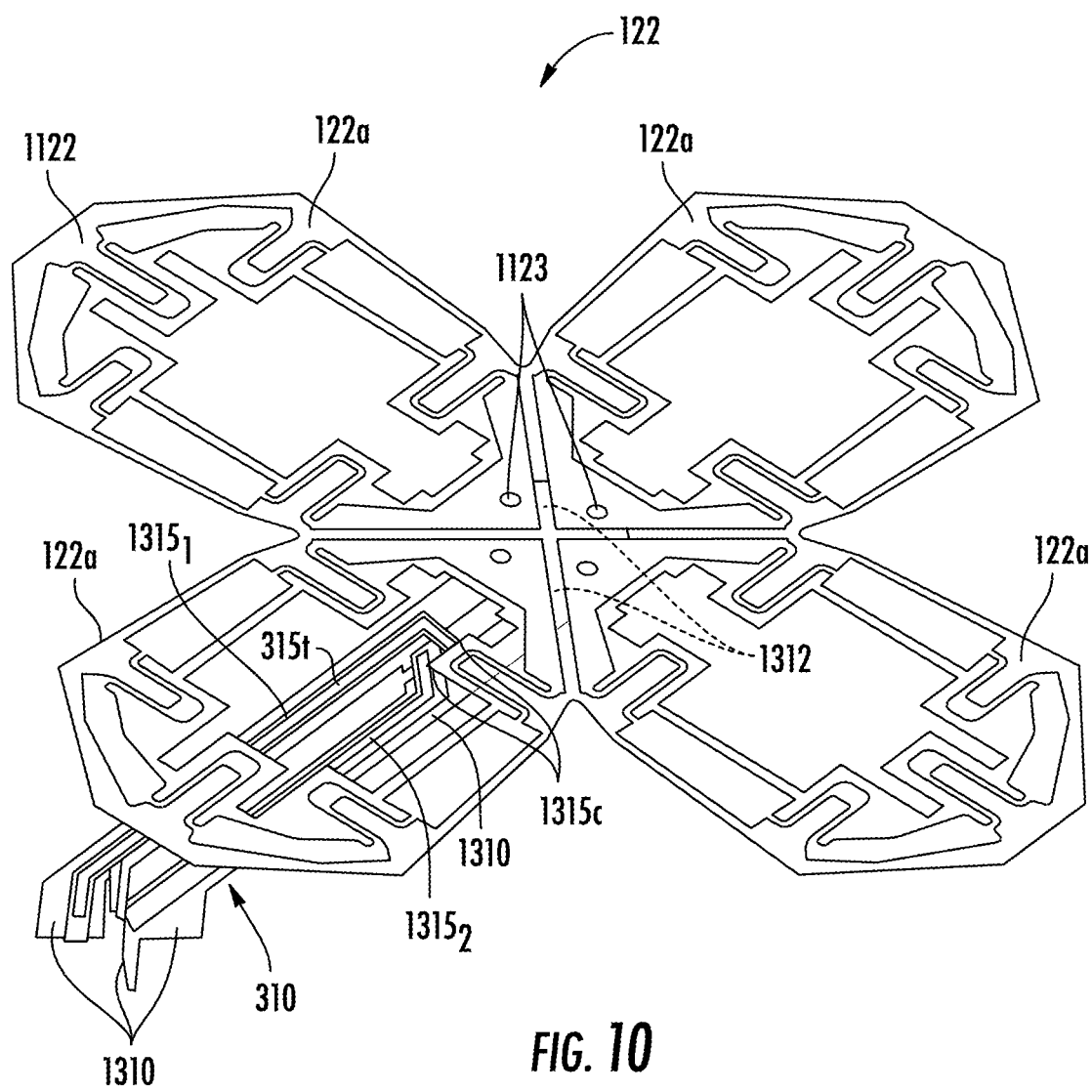
FIG. 10 is a front perspective view of another example embodiment of a radiating element with an angled feed stalk according to embodiments of the present invention.
Figure 17:
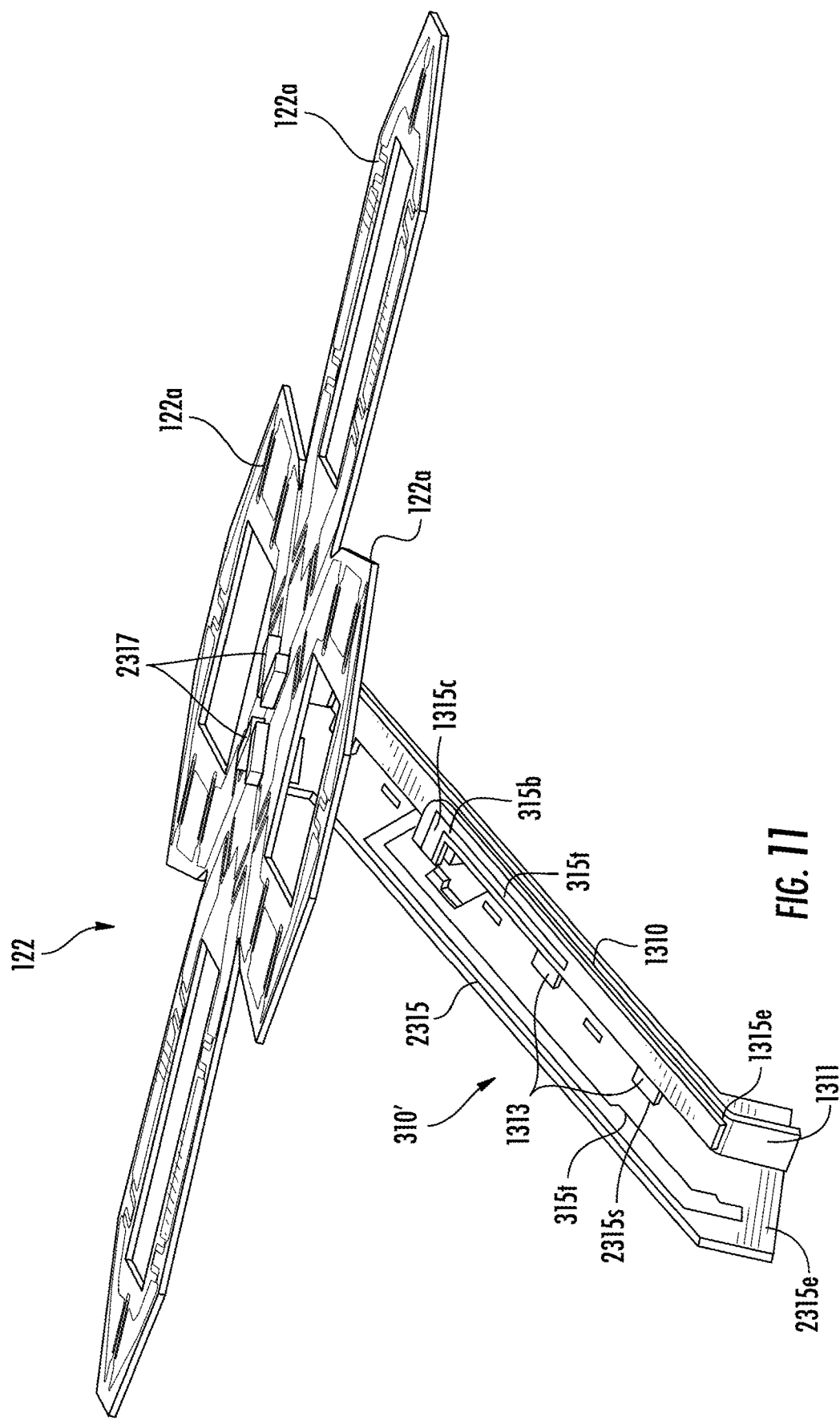
FIG. 17A is a rear, partially exploded view of an example base station antenna comprising the radiating elements with angled feed stalks according to embodiments of the present invention.
FIG. 17B is an assembled view of the device shown in FIG. 17A.

Referring to FIGS. 9A and 10, the feed stalk 310 can include first and second printed circuit boards 1315$_1$, 1315$_2$ that are each coupled to at least one sheet metal leg 1310. The first and second printed circuit boards 1315$_1$, 1315$_2$ are arranged to be orthogonal to each other, with one crossing over the other.

Figure 12:
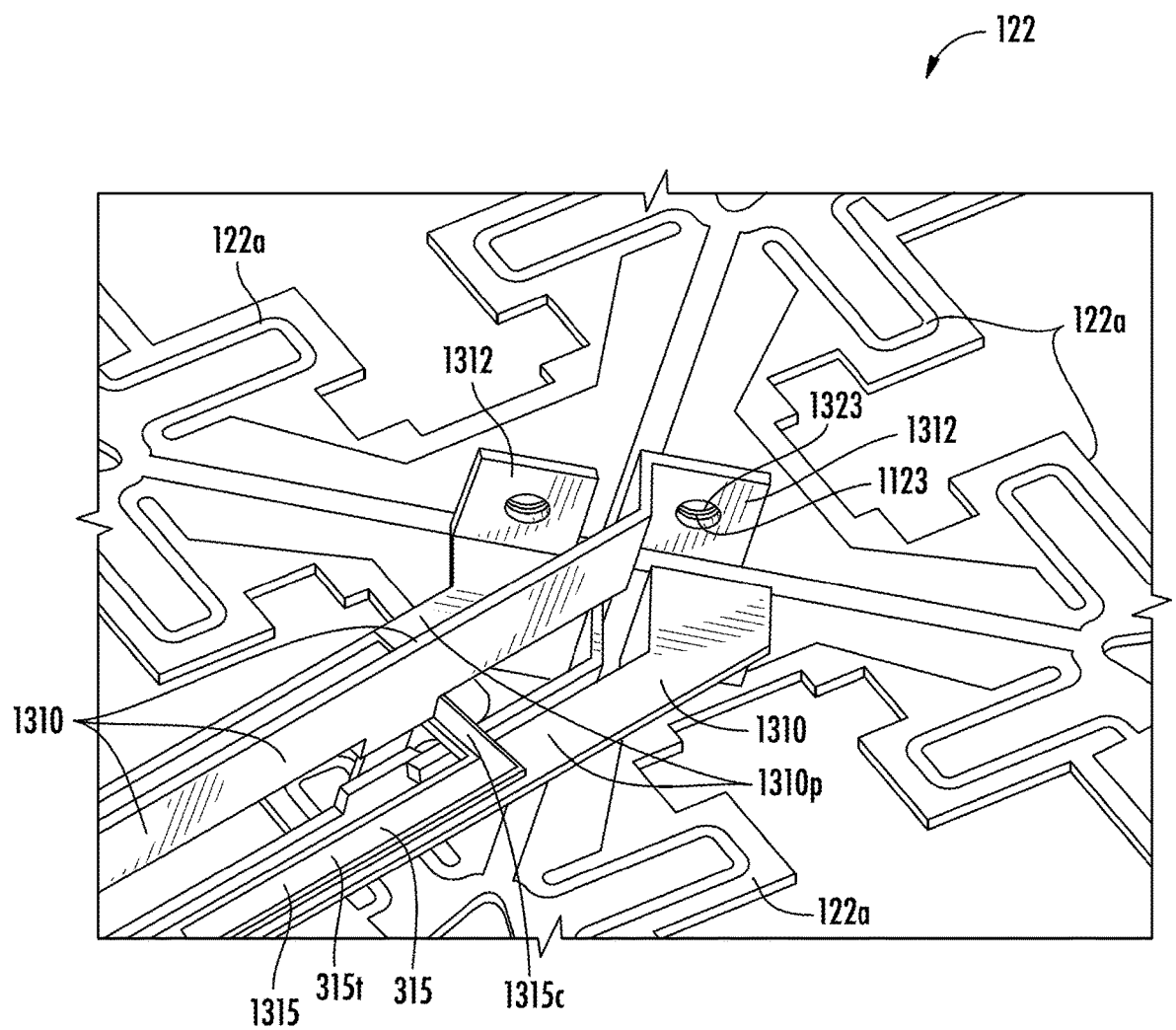
FIG. 12 is a partial bottom perspective view of a radiating element with an angled feed stalk according to embodiments of the present invention.

Referring to FIGS. 10 and 12, each of the first and second printed circuit boards 1315$_1$, 1315$_2$ may include a cross-segment 1315*c* with a continuation of the conductive trace 315*t* that extends along both pairs 1310*p* of sheet metal legs 1310 and that spans an open gap space between pairs 1310*p* of the sheet metal legs 1310.

Referring to FIGS. 9B and 9C, one or both of the first and second printed circuit boards 1315$_1$, 1315$_2$ can terminate above the reflector 112. One or both of an end portion 1315*e* of the first and second printed circuit boards 1315$_1$, 1315$_2$ can be coupled to a conductive (e.g., metal) feed member 1317 that can be used to connect the trace 315*t* of the feed circuit 315 to an RF transmission line on the reflector/feed board 112*b* or to a different feed (e.g., to a center conductor of a coaxial cable feed). A coaxial cable can be used and/or the conductive feed member 1317 can be extended to connect the feed board circuit. A coaxial cable can be used to connect to the power divider of phase shifter circuit. The connection configurations/types can vary depending on the network design.

The conductive feed member 1317 may have an "L" shape and have an end portion 1317*e* that is perpendicular to the reflector 112. A gasket 1319, which can be rectangular as shown, and can be electrically non-conductive, can be positioned between a lower end portion 1311 of a respective sheet metal leg 1310 and the end portion 1315*e* of the printed circuit board 1315 used to guide/support the lower end of the feed member 1317. The printed circuit board 1315 and conductive feed member 1317 can be coupled together, such as capacitively coupled or soldered or otherwise.

Referring to FIG. 11, another embodiment of a radiating element 122 is shown. In this embodiment, a second printed circuit board 2315 directly provides at least one leg of the feed stalk 310 without being coupled to an underlying sheet metal leg. The end portion 2315*e* of the second printed circuit board 2315 can be perpendicular to the reflector 112. The second printed circuit board 2315 can cooperate with at least one spaced apart cooperating sheet metal leg 1310. The second printed circuit board 2315 can be thicker than the first printed circuit board 1315 coupled to the at least one sheet metal leg 1310. The second printed circuit board 2315 can comprise a trace 315*t* of the feed circuit 315 and that trace 315*t* can be straight, meandering and/or curvilinear.

The second printed circuit board 2315 can have any outer perimeter shape such as square, rectangular, triangular or oval. The first printed circuit board 1315 can reside on two spaced apart sheet metal legs 1310 and can include a cross-segment 1315*c* with a continuation of the conductive trace 315*t* that extends along both sheet metal legs 1310 and that spans an open gap space between a cooperating pair of the sheet metal legs 1310. The second printed circuit board 2315 can have one or more slots 2315*s* that receive a respective cross-segment 1313 of the sheet metal legs 1310. The cross-segments 1313 may be used to mount the second printed circuit board 2315 in a desired position.

The first and second printed circuit boards 1315, 2315 can each have a respective hook balun 315*b*, one for each polarization.

Cooperating pairs of the sheet metal legs 1310 comprising a respective printed circuit board 1315 can be provided as a unitary body or separate components.

Figure 13:
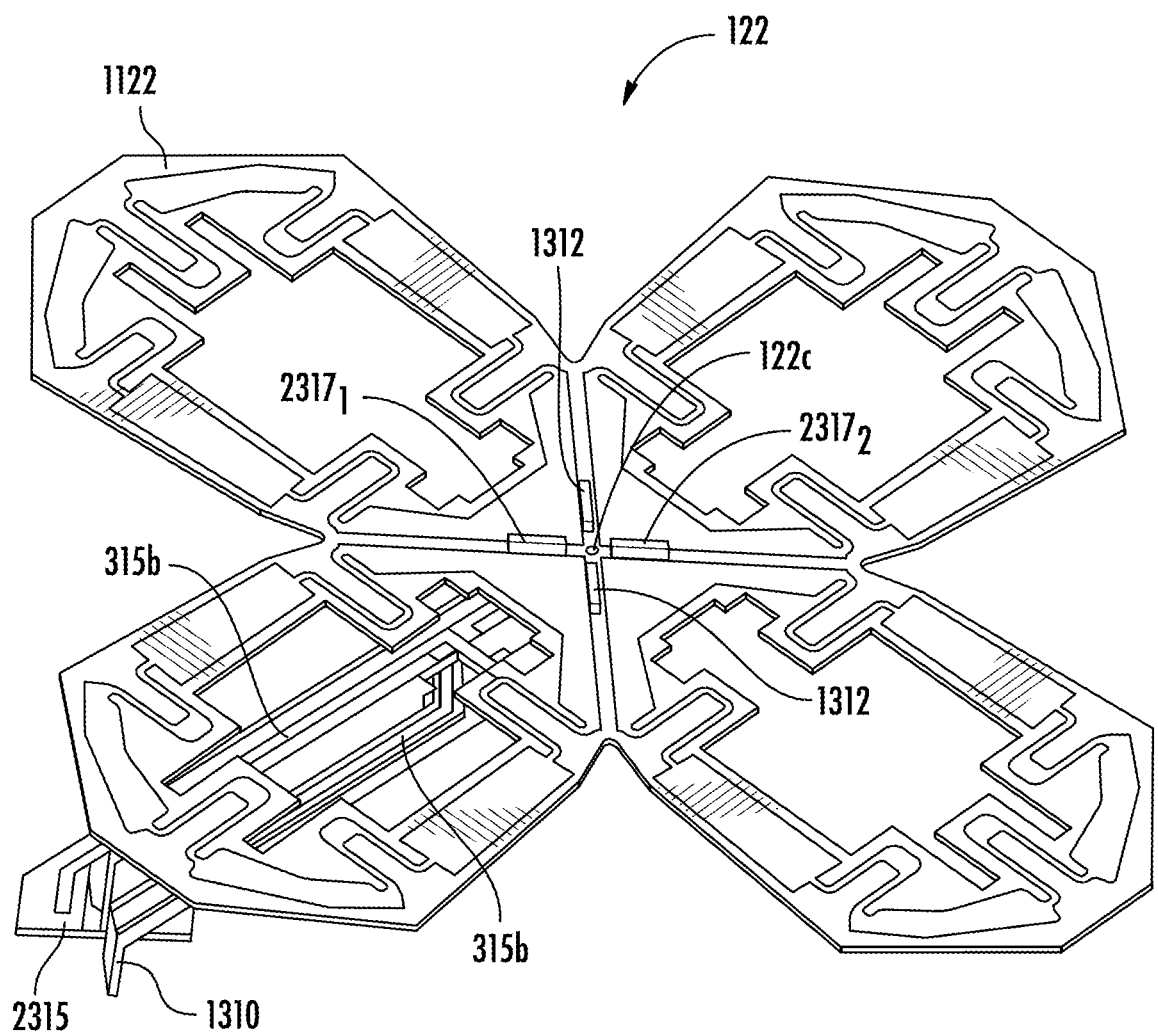
FIG. 13 is a top perspective view of another embodiment of a radiating element with an angled feed stalk according to embodiments of the present invention.

Referring to FIGS. 11 and 13, the outer end 2317 of the second printed circuit board 2315 can provide two spaced apart end segments 2317$_1$, 2317$_2$, on opposing sides of a center 122*c* of the radiating element 122 (a center between the dipole arms 122*a*). The second end portion 1312 of each sheet metal leg 1310 of the pair of cooperating sheet metal legs 1310*p* can be configured to reside on opposing sides of the center 122*c*, 90 degrees offset from the end segments 2317$_1$, 2317$_2$ of the printed circuit board 2315.

The printed circuit board 1315 with trace 315*t* that is coupled to the sheet metal leg(s) 1310 may or may not include an electrical ground layer opposite the trace 315*t*. In some embodiments, an electrical ground can be applied to the rear surface of the printed circuit board 1315 and/or the sheet metal leg 1310 and can be used as the electrical ground layer.

Referring to FIGS. 10 and 12, the second end portions 1312 of the sheet metal legs 1310 can be attached to a medial portion of the printed circuit board 1122 of the radiating element 1122 that provides the dipole arms 122*a*. As shown, there are four sets of aligned apertures 1123, 1323, one set in the printed circuit board 1122 and one set defined by one in each of the sheet metal legs 1310 that receive fixation members such as dielectric rivets, pins or screws that are used to attach the second end portions 1312 of the sheet metal legs 1310 to a bottom surface the printed circuit board 1122. The RF transmission lines 315*t* on the feed stalk 310 can be capacitively coupled to the dipole arms 122*a* of the radiating element 122.

Figure 14:
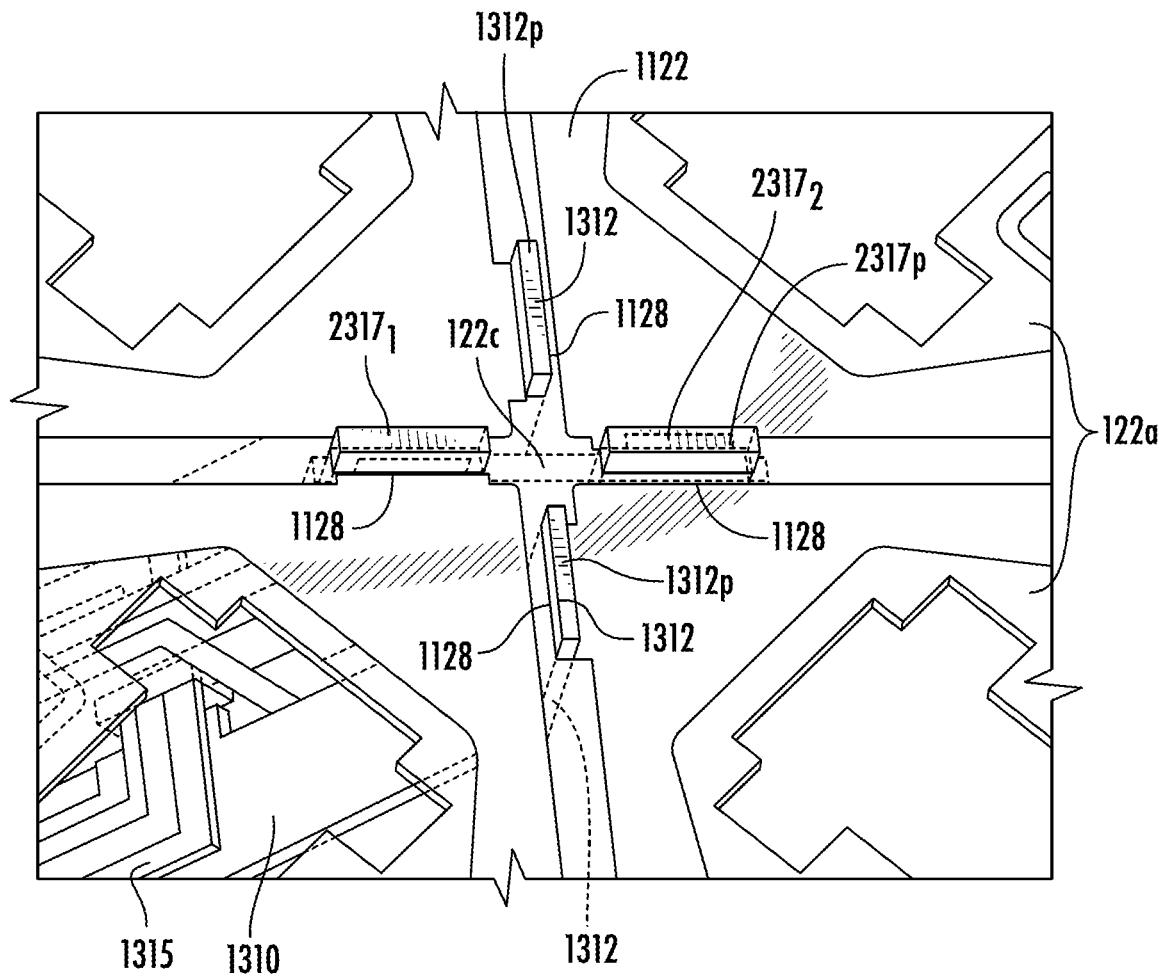
FIG. 14 is a greatly enlarged partial view of the top of the radiating element with the angled feed stalk shown in FIG. 13.
Figure 15A:
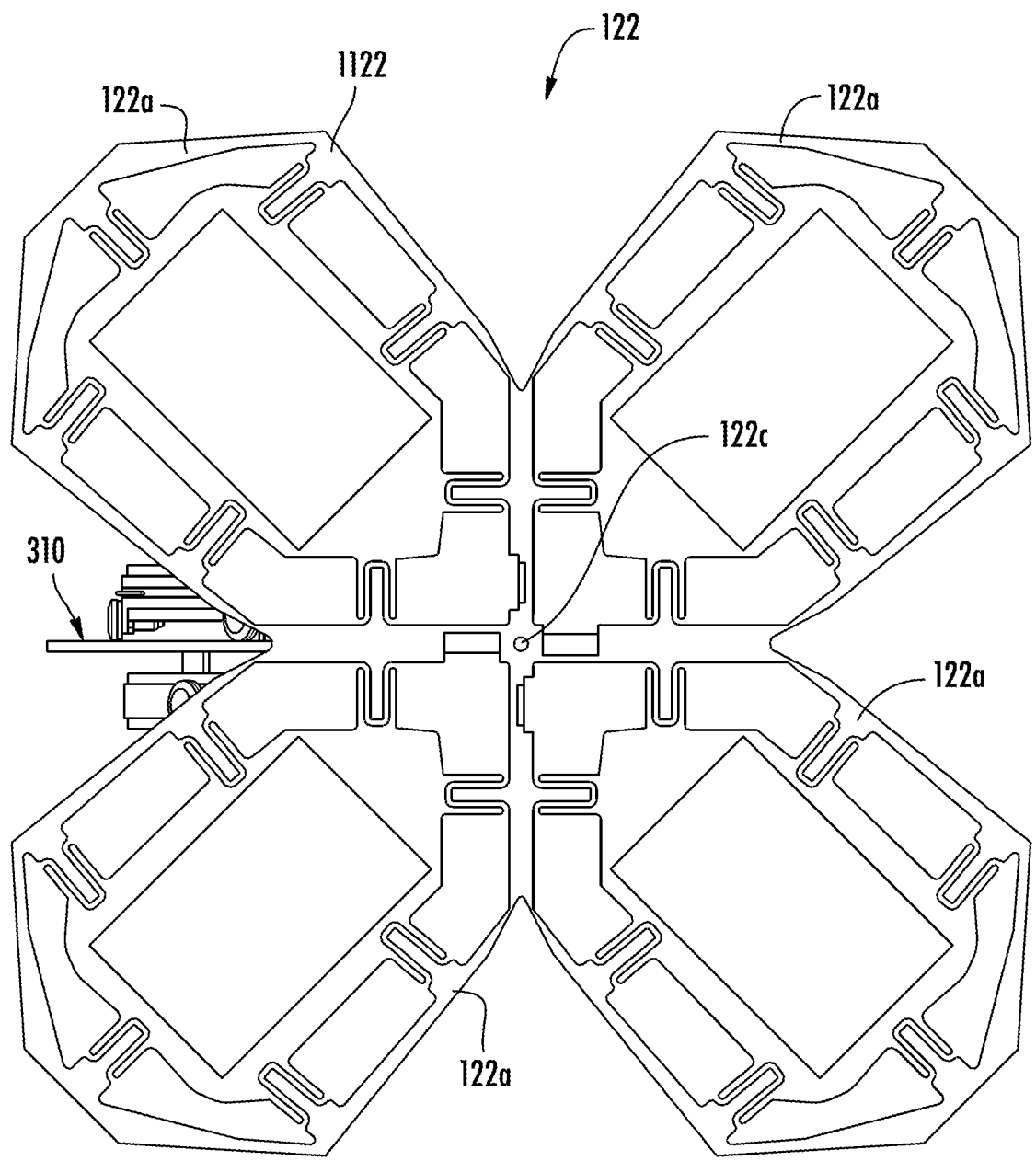
FIG. 15A is a top view of a radiating element with angled feed stalk according to embodiments of the present invention.
Figure 15B:
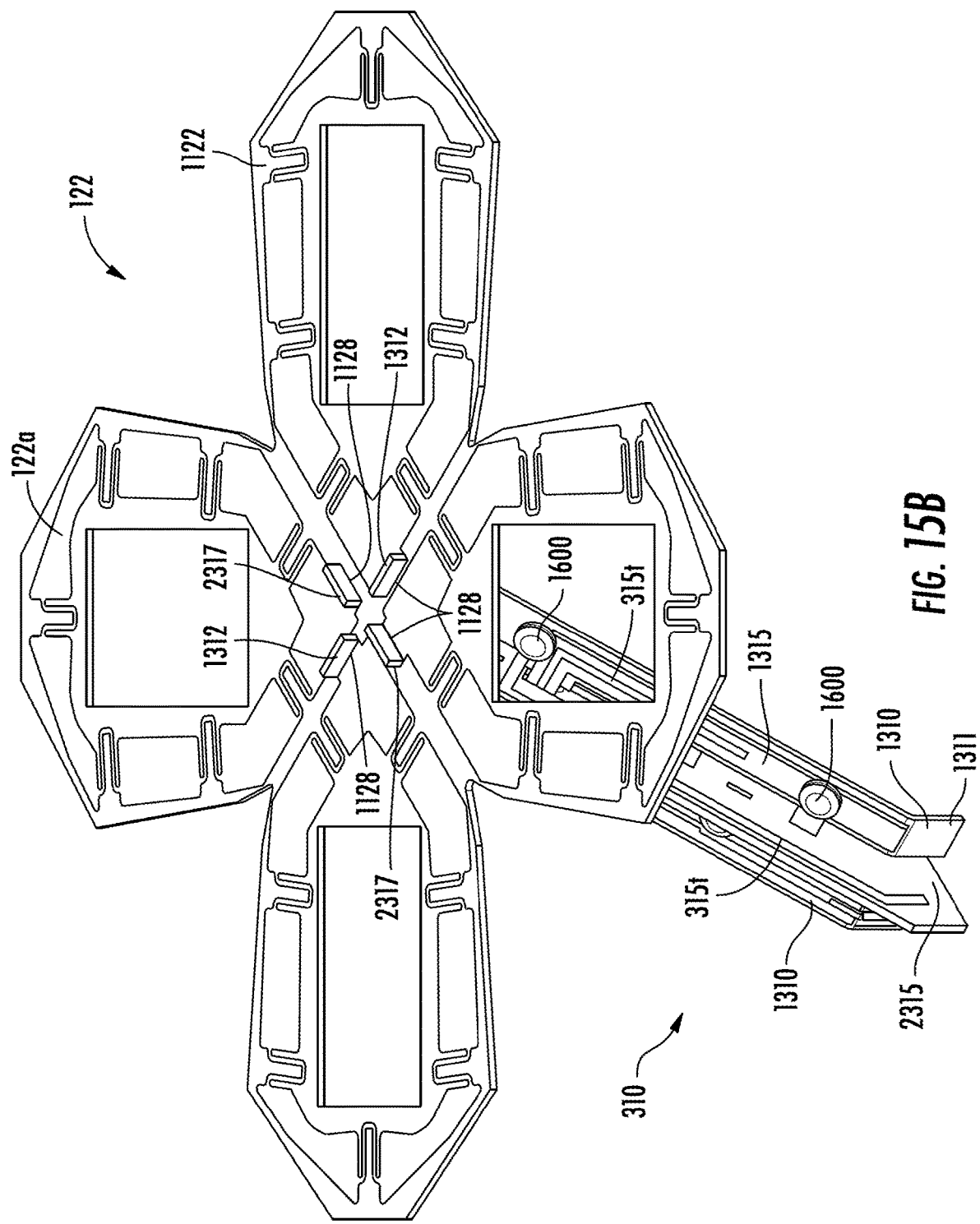
FIG. 15B is a side perspective view of the radiating element with angled feed stalk shown in FIG. 15A.
Figure 16B:
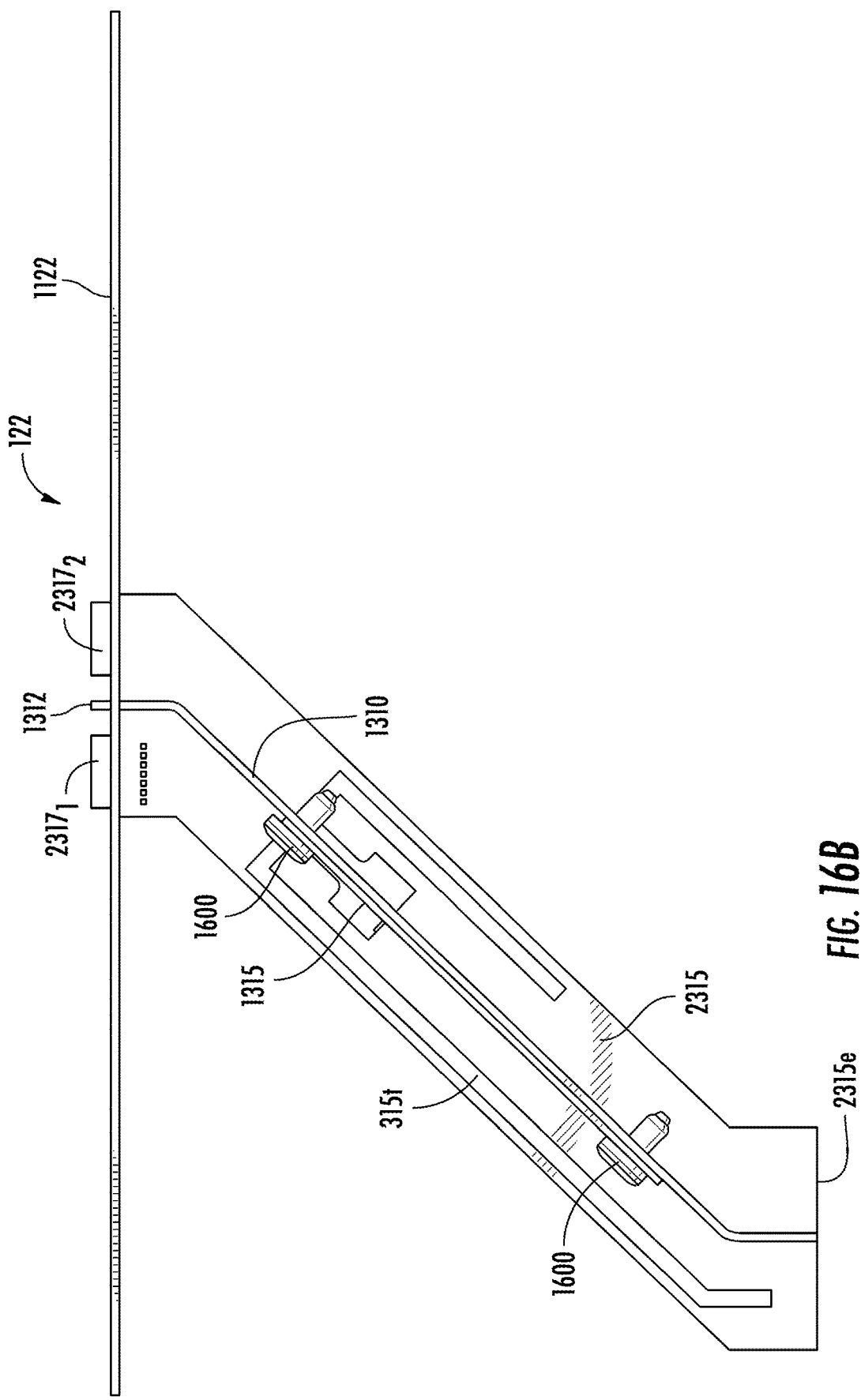
FIG. 16B is an enlarged side view of the radiating element with angled feed stalk, taken at 90 degrees from the view shown in FIG. 16A.
Figure 16D:
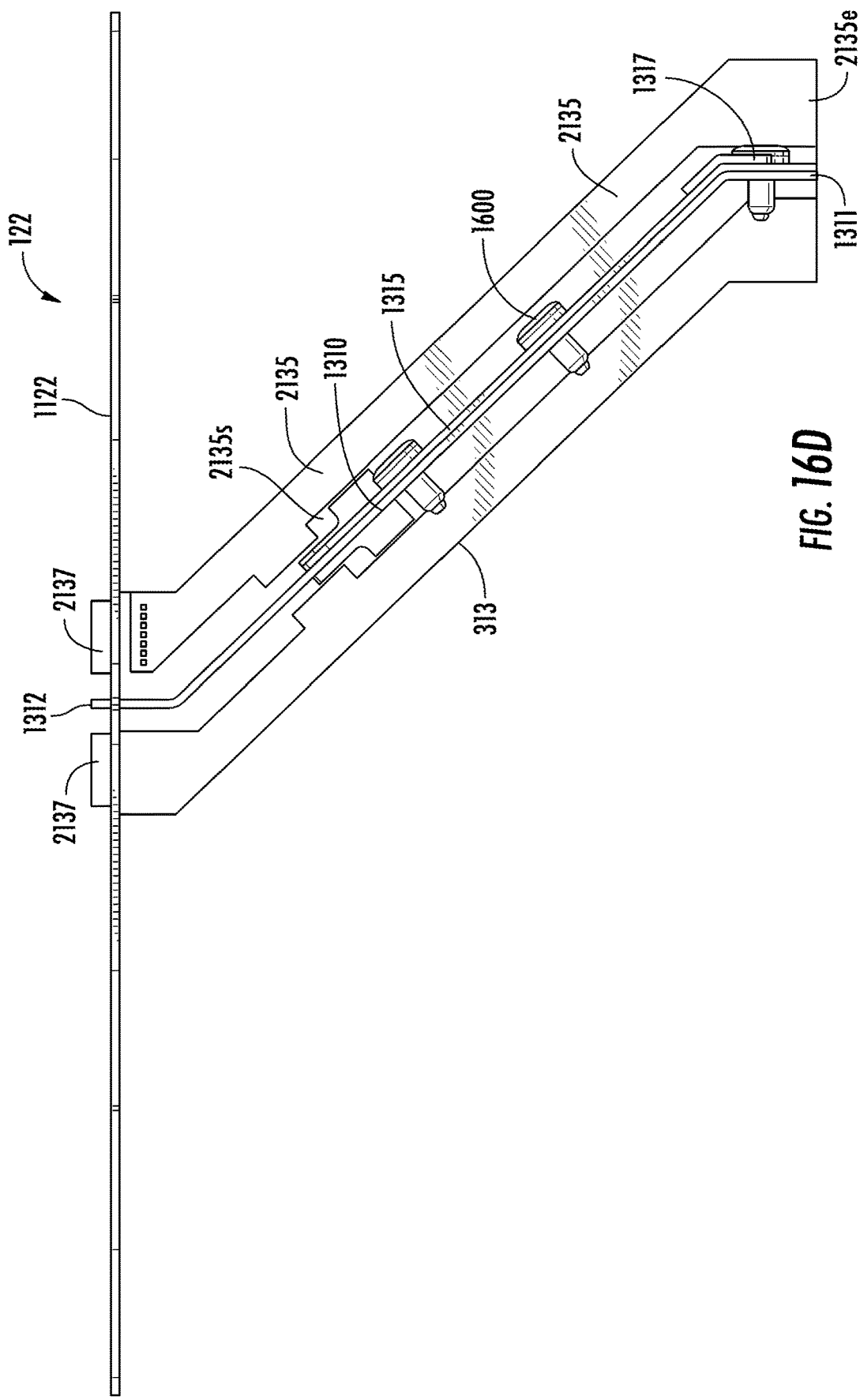
FIG. 16D is an enlarged side view of the radiating element with angled feed stalk opposite to the side shown in FIG. 16B.
Figure 16E:
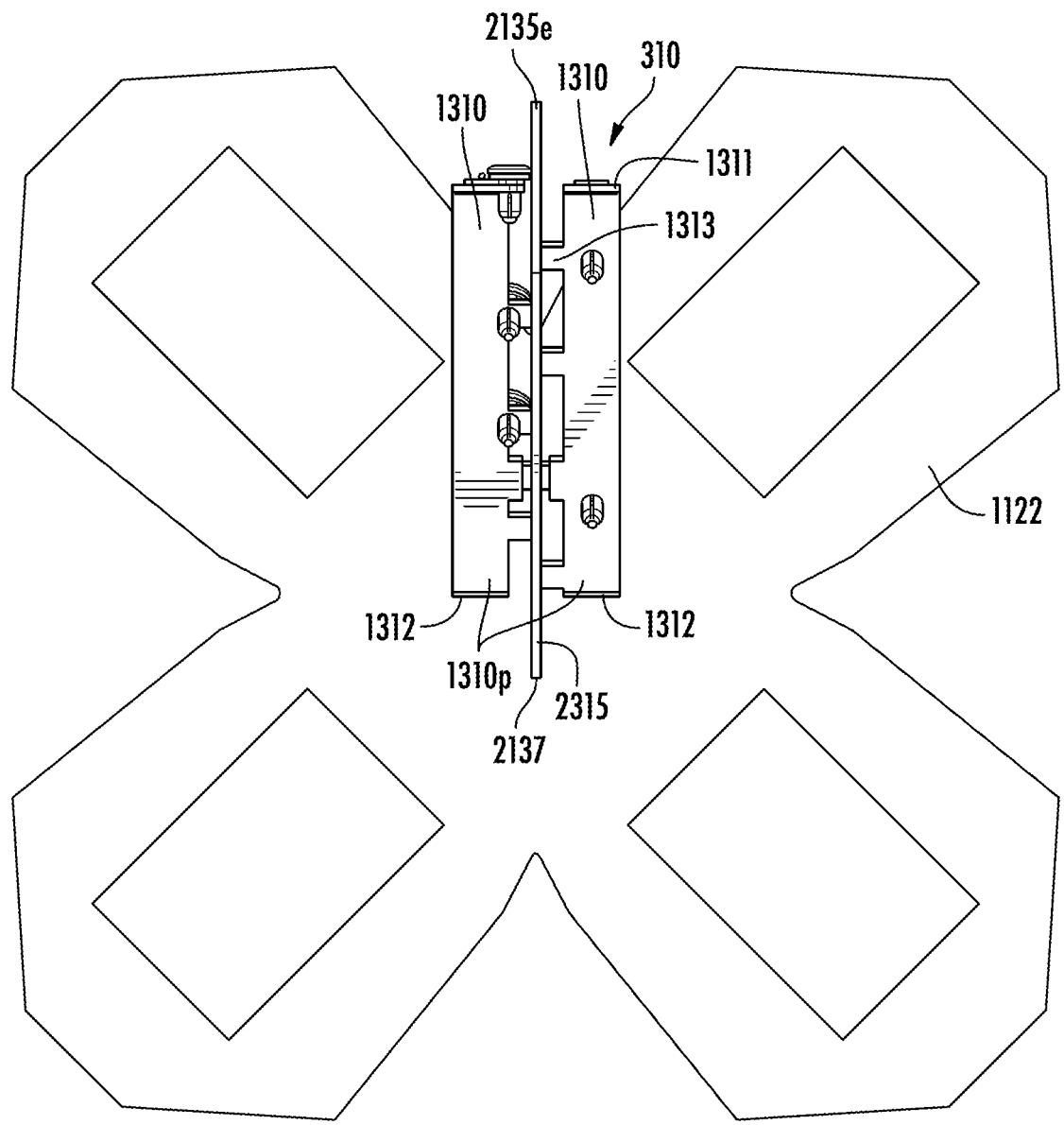
FIG. 16E is a bottom view of the radiating element with angled feed stalk shown in FIG. 15A.

Referring to FIGS. 13 and 14, in other embodiments, the second end portions 1312 of the pair 1310 of cooperating sheet metal legs 1310 and the first and second ends 2317$_1$, 2317$_2$ of the second printed circuit board 2315 can be attached to a medial portion of the printed circuit board 1122 of the radiating element 122 that provides the dipole arms 122*a*. As shown, there are open elongate apertures 1128 channels in the printed circuit board 1122 that receive projecting edges 1312*p* of the second end portions 1312 of the sheet metal legs 1310 and projecting edges 2317*p* of the first and second ends 2317$_1$, 2317$_2$ of the printed circuit board 2315. The apertures 1128 are arranged so that the two spaced apart end segments 2317$_1$, 2317$_2$, are aligned but on opposing sides of a center 122*c* of the radiating element 122 (a center between the dipole arms 122*a*). The projecting outer ends 1312*p* of the second end portions 1312 of the cooperating sheet metal legs 1310*p* are also aligned and reside on opposing sides of the center 122*c*, 90 degrees offset from the end segments 2317$_1$, 2317$_2$ of the second printed circuit board 2315. The projecting edges 2317*p*, 1312*p* can be soldered to the radiating element 122 providing the dipole arms 122*a* and provide a galvanic feed instead of a capacitive feed in this embodiment.

Referring to FIGS. 15A-15B and 16A-16B, another example embodiment is shown. The radiating element 122 comprises a feed stalk 310 coupled to the printed circuit board 1122 providing the radiating dipole arms 122*a*. The feed stalk 310 comprises the second printed circuit board 2315 and one pair 1310*p* of cooperating sheet metal legs 1310 with the first printed circuit board 1315.

The feed stalk 310 can also include coupling members 1600 that attach the first printed circuit board 1315 to the sheet metal legs 1310. The coupling members 1600 can comprise rivets fixing the 1315 to the metal stalk leg(s) 1310.

The projecting (outer) edges 1312*p*, 1217*p* extend outward from the printed circuit board 1122 through apertures 1128 and can be soldered to the printed circuit board 1122. Cross-segments 1313 under the printed circuit board 1122 can be coupled to or defined by (e.g., tabs) of the sheet metal legs 1310 and can be coupled to and/or extend to or through the second printed circuit board 2135.

Figure 17A:
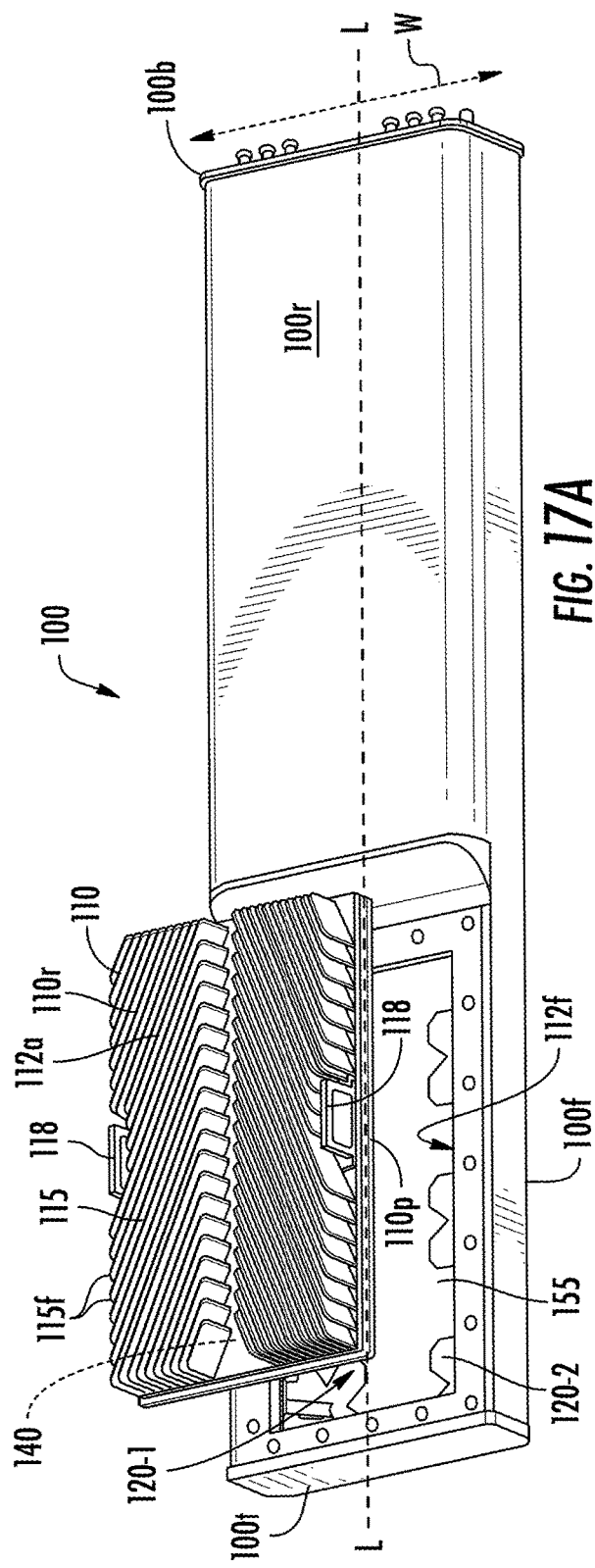
Figure 17B:
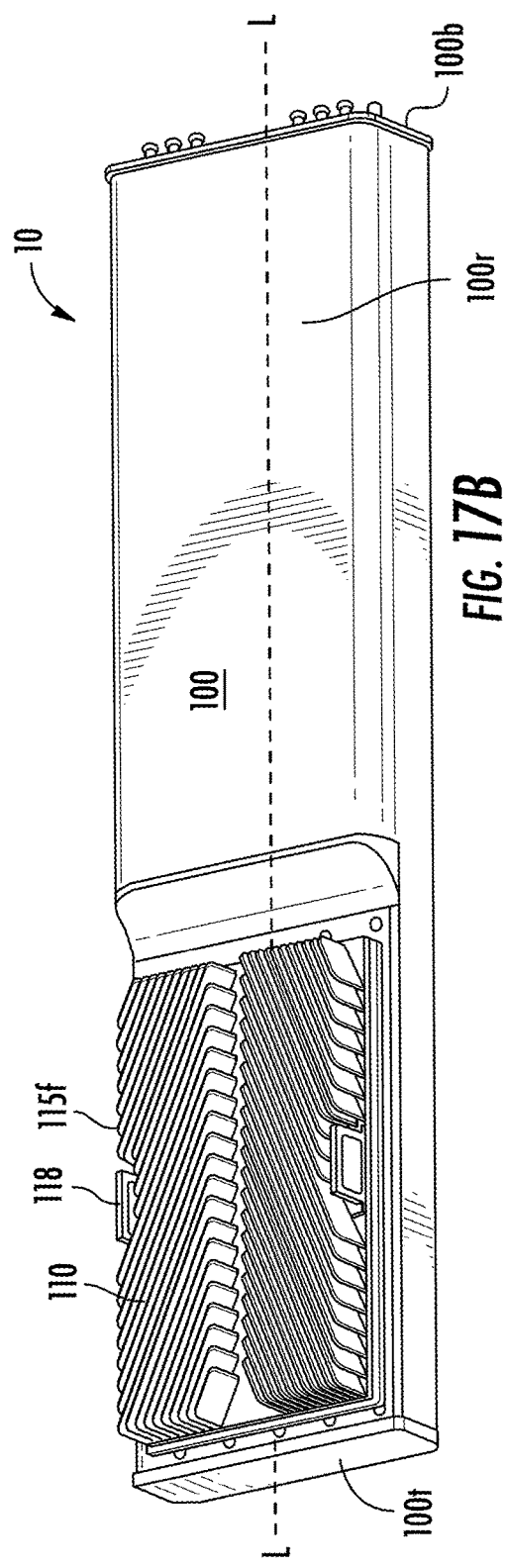
Figure 18A:
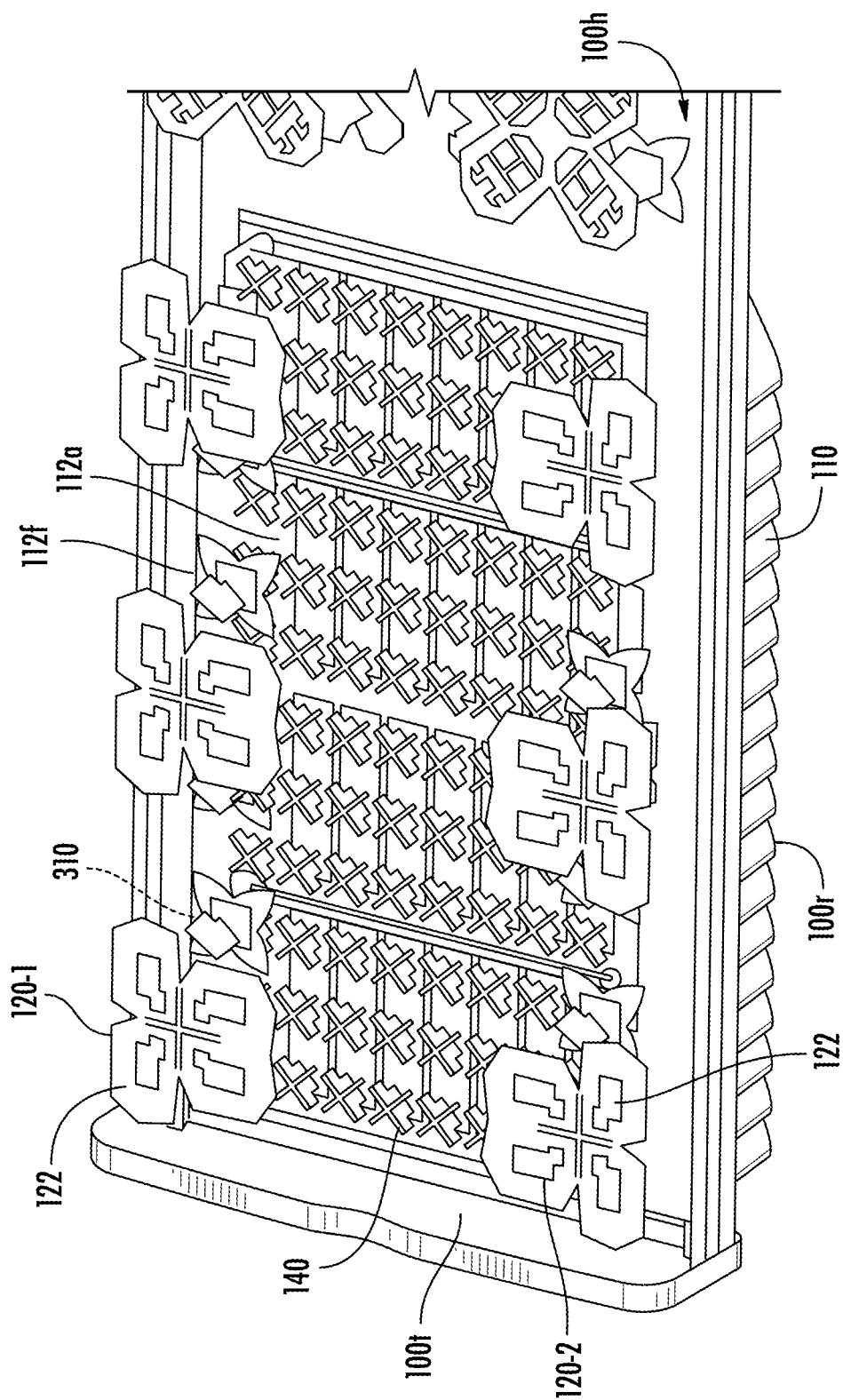
FIG. 18A is a partial, front perspective view (without the radome) of the base station antenna shown in FIGS. 17A, 17B.

Referring to FIGS. 17A, 17B and 18A, the base station antenna 100 comprises the first and second linear arrays 120-1, 120-2 and can be configured to sealably receive an active antenna module 110 that comprises the massive MIMO antenna array 140. The base station antenna 100 has a cavity 155 that receives a forward-facing segment of the active antenna module 110. The active antenna module 110 can extend at a top portion of the base station antenna 100, closer to the top than the bottom 100*b*. The active antenna module 110 can comprise a rear 110*r* with a heat sink 115 with external fins 115*f* and brackets 118. The term "active antenna module" refers to an integrated cellular communications unit comprising a remote radio unit (RRU) and associated antenna elements that is capable of electronically adjusting the amplitude and/or phase of the subcomponents of an RF signal that are output to different antenna elements or groups thereof. The active antenna module 110 comprises the RRU and antenna but may include other components such as a filter, a, calibration network, a controller and the like. The active antenna module 110 can have an outer perimeter 110*p* with an inner facing seal interface.

Figure 18B:
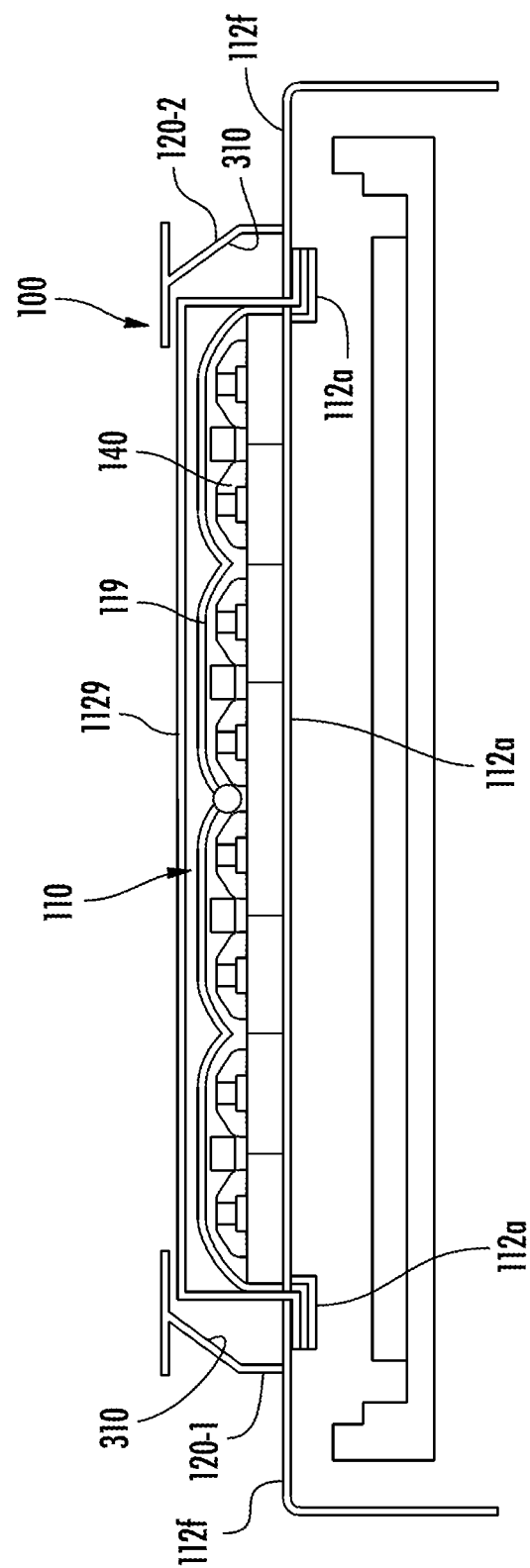
FIG. 18B is a simplified section view of the base station antenna shown in FIG. 18A illustrating split cooperating reflectors according to embodiments of the present invention.

As shown in FIGS. 18A and 18B, for example, the reflector 112 can be provided as a split reflector configuration comprising first and second capacitively coupled reflectors 112*f*, 112*a*, respectively. The first reflector 112*f* is a fixed reflector that resides in the base station antenna housing 100*h* and includes segments under/behind the feed stalks 310, 310', 310" of the low band radiating elements 120-1, 120-2. The second reflector 112*a* is coupled to the multi-column array 140 and resides in the removable active antenna module 110. The reflector 112*f* of the passive antenna assembly in the base station antenna 100 typically comprises a sheet of metal or a frequency selective surface and is maintained at electrical ground. See, e.g., U.S. Provisional Patent Application Ser. No. 63/136,757, the contents of which are hereby incorporated by reference as if recited in full herein. Thus, a reflector 112 such as the first or second reflector 112*f*, 112*a*, respectively, can comprise a frequency selective surface can reside behind at least some antenna elements and can selectively reject some frequency bands and permit other frequency bands to pass therethrough by including the frequency selective surface and/or substrate to operate as a type of "spatial filter". See, e.g., Ben A. Munk, Frequency Selective Surfaces: Theory and Design, ISBN: 978-0-471-37047-5; DOI: 10.1002/0471723770; April 2000, Copyright © 2000 John Wiley & Sons, Inc. the contents of which are hereby incorporated by reference as if recited in full herein.

The reflector 112*f* can act to redirect RF radiation that is emitted backwardly by the radiating elements in the forward direction, and also serves as a ground reference for the radiating elements. When the active antenna is configured as a separate active antenna module 110, the reflector 112*a* of the active antenna module 110 is coupled, upon assembly to the base station antenna housing 100*h*, to the reflector 112*f* so that the reflectors 112*a*, 112*f* are at a common electrical ground reference. The active antenna reflector 112*a* can be spaced apart from the reflector 112*f* (in a front to back direction) about a small gap space that is typically in a range of about 3 mm-about 10 mm, in some embodiments. As shown in FIG. 18B, the base station antenna 100 may also include at least one internal radome 119 residing over the multi-column array 140 and which is part of the active antenna module 110. The base station antenna may optionally also include an intermediate radome 1129 that resides between the outer radome 111 and the internal radome 119. For further discussion of example active antenna modules 110 and cooperating (e.g., split) reflectors for base station antennas 100, see, co-pending, co-assigned U.S. Provisional Application Ser. No. 63/082,265, filed Sep. 23, 2020, and the contents of which are hereby incorporated by reference as if recited in full herein.

The radiating elements 122 of the first and second linear arrays 120-1, 120-2 can also be interchangeably referred to as a "dual polarized radiators" with first and second dipole radiators having first, second, third and fourth dipole arms 122*a*.

Referring to FIGS. 18A and 18B, the radiating elements 122 (e.g., low band radiating elements) can reside in front of the two reflectors 112*f*, 112*a* and can operate with both reflectors as a portion of a respective radiating element 122 can reside in front of the first reflector 112*f* while another portion of the respective radiating element 122 can reside in front of the other reflector 112*a*. The two different reflectors can be adjacently positioned, optionally laterally spaced apart and longitudinally extending reflectors.

Referring to FIG. 18B, adjacent segments of the first and second reflectors 112*f*, 112*a* can be separated by a radome 119 and/or 1129 therebetween. The radome 119 and/or 1129 and/or air gap spaces provided by same can define a dielectric for capacitively coupling the reflectors 112*f*, 112*a*.

The first and second dipole radiators may be configured to transmit RF radiation having slant −45° and slant +45° polarization. These radiating elements may be particularly well-suited for use in base station antennas that have a multi-column array 140 of radiating elements 145 that operate in a higher frequency band than the radiating elements 122 according to embodiments of the present invention.

The low-band radiating elements 122 may be configured to transmit and receive signals in a first frequency band such as, for example, the 617-960 MHz frequency range or a portion thereof. The high-band radiating elements 145 can be mounted in columns to form 4-12 linear arrays of high-band radiating elements. The multi-column array 140 of high-band radiating elements 145 may be configured to transmit and receive signals in a higher frequency band such as, for example, the 3300-4200 MHz frequency range or a portion thereof or even higher frequency (typically in a 3 GHz-6 GHz range).

So-called "cloaked" low-band radiating elements have been developed that are designed to be "transparent" to RF signals in the operating frequency band of nearby higher-band radiating elements. See, e.g., one example of a known cloaked dual-polarized low-band radiating element 100, which is disclosed in U.S. Patent Publication No. 2018/0323513 ("the '513 publication"), filed Feb. 15, 2018, the entire content of which is incorporated herein by reference. The radiating element 100 generates both slant −45° and slant +45° radiation, and is typically called a "cross-dipole" radiating element as it includes two dipole radiators that form a cross shape when viewed from the front.

Each dipole arm 122a may be formed as a metal pattern on printed circuit board 1122. Each metal pattern includes a plurality of widened conductive members that are connected by narrowed trace sections. The narrowed trace sections may be implemented as meandered conductive traces. Herein, a meandered conductive trace refers to a non-linear conductive trace that follows a meandered path to increase the path length thereof. The meandered conductive trace sections may have extended lengths yet still have a small physical footprint.

Each dipole arm 122a may comprise a loop that includes a series of alternating widened conductive members and narrowed trace sections. Each pair of adjacent widened conductive members may be physically and electrically connected by a respective one of the narrowed trace sections. Since the narrowed trace sections have a small physical footprint, adjacent widened conductive members may be in close proximity to each other so that the widened conductive members together appear as a single dipole arm at frequencies within the operating frequency range of the low-band radiating element 122. It will be appreciated that in other embodiments, the dipole arms need not have a closed loop design as explained, for example, in the '513 publication (e.g., the distal ends of two segments that form the loop may not be electrically connected to each other).

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A radiating element for a base station antenna, comprising:
  a plurality of dipole arms; and
  a feed stalk coupled to the dipole arms,
  wherein the feed stalk has longitudinally spaced apart opposing first and second end portions, wherein the second end portion is adjacent the dipole arms and the first end portion is behind the second end portion, wherein the second end portion resides at a first lateral position and is configured to reside closer to a front of the base station antenna than the first end portion, wherein the first end portion is laterally offset from the first lateral position and resides closer to an adjacent most right or left side of the base station antenna than the second end portion, and wherein the plurality of dipole arms are configured as a cross-dipole radiating element.

2. The radiating element of claim 1, wherein the plurality of dipole arms are parallel to a primary surface of a reflector that resides behind the plurality of dipole arms, wherein the feed stalk has at least one angled segment that resides between the first and second end portions, and wherein the at least one angled segment extends at an angle β measured between the at least one angled segment and the reflector that is in a range of about 30-60 degrees.

3. The radiating element of claim 2, wherein the feed stalk has at least one angled segment that resides between the first and second end portions, wherein the at least one angled segment is a single angled segment that starts at a location above a rear facing end of the first end portion and below a medial location of the feed stalk and that extends at a constant angle between the first and second end portions at an angle of inclination β that is different than an angle of inclination of the feed stalk behind the single angled segment.

4. The radiating element of claim 2, wherein the plurality of dipole arms are provided by a printed circuit board that is coupled to the second end portion of the feed stalk at a medial location thereof, and wherein the first and second end portions of the feed stalk comprise at least an end segment that is perpendicular to the printed circuit board.

5. The radiating element of claim 1, wherein the feed stalk comprises a feed stalk body that has first and second segments that reside between the first and second end portions and that are at different angles from each other.

6. The radiating element of claim 1, wherein the feed stalk comprises:
at least one leg of sheet metal; and
a first printed circuit board coupled to the at least one leg of sheet metal.

7. The radiating element of claim 6, wherein the at least one leg of sheet metal is arranged as a plurality of cooperating legs of sheet metal, and wherein first and second legs of the plurality of cooperating legs of sheet metal comprise an RF transmission line coupled thereto.

8. The radiating element of claim 1, wherein the feed stalk comprises a first printed circuit board that is coupled to a pair of spaced apart cooperating sheet metal legs.

9. The radiating element of claim 1, wherein the feed stalk comprises first and second cooperating sheet metal legs and a printed circuit board comprising an RF transmission line held conformally to a sub-length of the first and second sheet metal legs, and wherein the printed circuit board comprises a cross-segment that spans across a gap space between the first and second legs at a location closer to and below the second end portion of the feed stalk than the first end portion of the feed stalk.

10. The radiating element of claim 9, wherein the printed circuit board is a first printed circuit board, the feed stalk further comprising a second printed circuit board having a rigid or semi-rigid and self-supporting shape that is spaced apart from the at least two sheet metal legs and comprises an RF transmission line, wherein the second printed circuit board is orthogonal to the first printed circuit board.

11. The radiating element of claim 10, wherein the second printed circuit board is coupled to the first and second sheet metal legs and comprises a slot, and wherein the cross-segment of the first printed circuit board extends through the slot.

12. The radiating element of claim 1, wherein the feed stalk comprises at least two elongate legs of sheet metal that extend at least a major length of the feed stalk between the first and second end portions, wherein the at least two elongate legs of sheet metal are provided as four elongate legs of sheet metal arranged in first and second pairs of elongate legs of sheet metal, wherein the first pair of legs of sheet metal is coupled to a first printed circuit board and the second pair of elongate legs of sheet metal is coupled to a second printed circuit board.

13. The radiating element of claim 1, wherein the feed stalk comprises a second printed circuit board that is orthogonal to the first printed circuit board, and wherein the first and second printed circuit boards each include a respective hook balun.

14. The radiating element of claim 1, wherein the first printed circuit board is orthogonal to the second printed circuit board.

15. A base station antenna, comprising:
a reflector;
a first array comprising a first vertically-extending column of cross-dipole radiating elements and mounted to be forward of the reflector; and
a second array comprising a second vertically-extending column of cross-dipole radiating elements and mounted to be forward of the reflector,
wherein at least some of the radiating elements of the first and second arrays each comprise a feed stalk that extends in a front-to-back direction of the base station antenna, wherein the feed stalk has spaced apart opposing first and second end portions, wherein the first end portion is rearward of the second end portion and is configured to couple to a feed network, and wherein the first end portion resides closer to an adjacent most one of a right or left side of the base station antenna than the second end portion.

16. The base station antenna of claim 15, further comprising a multiple column array that is positioned laterally between the first array and the second array of radiating elements.

17. The base station antenna of claim 16, wherein the radiating elements of the first array and the second array are low-band radiating elements, wherein the radiating elements of the multiple column array are higher-band radiating elements than the low-band radiating elements, and wherein some columns of the multiple column array reside behind and overlap with cross-dipole radiating elements of the first array or the second array.

18. The base station antenna of claim 15, wherein the feed stalk has at least one angled segment that resides between the first and second end portions, and wherein the at least one angled segment that starts at a location above a rear facing end of the first end portion and below a medial location of the feed stalk and that extends at an angle β measured between the at least one angled segment and a reflector that is in a range of about 30-60 degrees.

19. The base station antenna of claim 15, wherein the feed stalk comprises a first printed circuit board that is coupled to a pair of spaced apart cooperating sheet metal legs.

20. The base station antenna of claim 19, wherein the feed stalk comprises a second printed circuit board that is orthogonal to the first printed circuit board.

21. The base station antenna of claim 15, wherein the feed stalk comprises first and second cooperating sheet metal legs and a printed circuit board comprising an RF transmission line held conformally to a sub-length of the first and second sheet metal legs, and wherein the printed circuit board comprises a cross-segment that spans across a gap space between the first and second legs at a location closer to and below the second end portion of the feed stalk than the first end portion of the feed stalk.

22. The base station antenna of claim 15, wherein the feed stalk comprises four elongate legs of sheet metal arranged as first and second pairs of elongate legs of sheet metal, wherein the first pair of legs of sheet metal is coupled to a first printed circuit board and the second pair of elongate legs of sheet metal is coupled to a second printed circuit board, and wherein the first printed circuit board is orthogonal to the second printed circuit board and reside under a printed circuit board providing a respective radiating element of the first and second arrays.

23. The base station antenna of claim 15, wherein the first and second arrays are each provided as a single column of radiating elements, the first array on a right side of the base station antenna and the second array on a left side of the base station antenna.

24. The base station antenna of claim 15, wherein the first end portion of the feed stalk is coupled to and/or resides adjacent to a side wall of a housing of the base station antenna and extends laterally inwardly relative to the side wall.

25. The base station antenna of claim 15, wherein the reflector comprises a reflector side wall that is orthogonal to a primary surface of the reflector, and wherein the first end portion of the feed stalk projects laterally inwardly from the reflector side wall.

26. A base station antenna comprising:
- a first reflector;
- a second reflector;
- a plurality of radiating elements, wherein a first segment of a respective radiating element overlaps the first reflector and a second segment of the respective radiating element overlaps the second reflector; and
- a radome between adjacent segments of the first and the second reflector.

27. The base station antenna of claim 26, wherein the first and second reflectors are capacitively coupled.

* * * * *